United States Patent
Jensen

(10) Patent No.: US 7,588,686 B2
(45) Date of Patent: Sep. 15, 2009

(54) DUAL POROSITY FILTER

(75) Inventor: Marina B. Jensen, Virum (DK)

(73) Assignee: University of Copenhagen, Copenhagen (DK)

( * ) Notice: Subject to any disclaimer, the term of this patent is extended or adjusted under 35 U.S.C. 154(b) by 557 days.

(21) Appl. No.: 10/519,025

(22) PCT Filed: Jun. 26, 2003

(86) PCT No.: PCT/DK03/00443

§ 371 (c)(1),
(2), (4) Date: Dec. 22, 2004

(87) PCT Pub. No.: WO2004/002605

PCT Pub. Date: Jan. 8, 2004

(65) Prior Publication Data

US 2005/0199558 A1    Sep. 15, 2005

(30) Foreign Application Priority Data

Jun. 26, 2002   (DK) .............................. 2002 00986

(51) Int. Cl.
*B01D 11/00* (2006.01)
(52) U.S. Cl. .................... 210/634; 95/107; 95/273; 95/274; 95/287; 96/131; 96/132; 96/142; 96/154; 210/266; 210/284; 210/290; 210/291; 210/484; 210/485; 210/489; 210/335; 210/511; 210/638; 210/678; 210/679; 210/806
(58) Field of Classification Search .................... 95/90, 95/107, 273, 274, 285–287; 96/108, 121, 96/131, 142, 154, 155, 132; 210/263–266, 210/283, 284, 290, 291, 488, 511, 259, 638, 210/639, 644, 660, 677–679, 690, 806, 335, 210/483–485, 489, 634

See application file for complete search history.

(56) References Cited

U.S. PATENT DOCUMENTS

| | | | |
|---|---|---|---|
| 4,117,079 A | 9/1978 | Bellows | |
| 4,761,232 A | 8/1988 | Bright | 210/500 |
| 5,295,583 A | 3/1994 | Bischofberger et al. | 209/17 |
| 5,417,938 A * | 5/1995 | Shelden et al. | 422/196 |
| 5,632,889 A | 5/1997 | Tharp | 210/165 |
| 5,772,900 A | 6/1998 | Yorita et al. | 210/805 |
| 5,776,567 A | 7/1998 | Schilling et al. | 428/34.5 |
| 5,788,849 A | 8/1998 | Hutter, Jr. et al. | 210/163 |
| 5,980,761 A | 11/1999 | Boissie et al. | 210/807 |
| 6,080,307 A | 6/2000 | Morris et al. | 210/163 |
| 6,238,464 B1 | 5/2001 | Dullien et al. | |
| 6,307,111 B1 * | 10/2001 | Fennhoff et al. | 568/728 |
| 6,905,576 B1 * | 6/2005 | Block et al. | 203/29 |
| 2004/0238443 A1 * | 12/2004 | Gohrt et al. | 210/638 |
| 2006/0273008 A1 * | 12/2006 | Phillips | 210/644 |

FOREIGN PATENT DOCUMENTS

| | | | |
|---|---|---|---|
| DE | 19701045 | * | 9/1998 |
| EP | 466954 | * | 7/1990 |
| GB | 2201355 | | 9/1988 |
| WO | WO-01/93976 | | 12/2001 |
| WO | WO-0200326 | | 1/2002 |

* cited by examiner

*Primary Examiner*—Joseph W Drodge
(74) *Attorney, Agent, or Firm*—Gifford, Krass, Sprinkle, Anderson & Citkowski, P.C.

(57) ABSTRACT

Disclosed is a method and a filter unit for depleting or enriching a liquid or gas with substance(s) comprising i) providing a filter unit comprising at least one convective layer and at least one receiving layer adjacent one another, ii) passing the liquid or gas through the filter so that the main direction of flow is along the layers and the main flow of liquid gas is in the convective layer, allowing the substance(s) to: a) be transferred from a convective layer to a receiving layer, and b) be retained or otherwise modified or transferred within a receiving layer, or c) be provided by the receiving layer, and d) be transferred from the receiving layer to the fluid in the convective layer.

25 Claims, 21 Drawing Sheets

DUAL POROSITY FILTER

FIELD OF INVENTION

The present invention relates to a method and a device for removal of substance(s) from or a fluid. The invention additionally relates to a device for enrichment of a fluid with substance(s). The invention particularly relates to a fluid treatment method where the fluid of interest is running parallel to a compartment designed for exchange of substance(s) with the fluid. All patent and non-patent references cited in the present application, are hereby incorporated by reference in their entirety.

BACKGROUND OF INVENTION

Filters for removing polluting components from liquid and gas are known from the prior art. Filtration is usually understood as a process of separating dispersed particles, and some times solutes too, from a fluid by drawing the fluid across a porous medium. The invention described here is in this respect not a true filtration in that the fluid is not drawn across the porous medium, but flows along it without crossing it.

Traditional filters suffer from the dilemma that on one hand they need to have an open structure in order to retain a certain hydraulic conductivity, but on the other hand the structure must not be too open in order to retain dispersed particles and solutes. Traditional filters suffer from gradually falling hydraulic conductivity (pressure drop across the filter) as more and more particles are trapped within the filter medium. Clogging rather than use-up of filter capacity often determines the frequency of filter regeneration or replacement.

One type of prior art filters is based on a layered structure with different pore sizes and sorption capacities in the layers. The liquid or gas moves through the layers of these known filters sequentially, most often first through one or more macroporous layers to remove particulate material and then through one or more microporous layers having the capacity to absorb dissolved or dispersed material. The drawback of these filters is mainly that materials with low hydraulic capacity (and high absorptive capacity) cannot be used under practical circumstances, because the flow rate will be too low. Another drawback is that once the filtering capacity of the microporous layer in an area is exhausted, then the whole layer must be exchanged, as there is a risk the filter leaks pollutants.

Another prior art filter with two types of pores is one where micro- and macropores are mixed throughout the filter volume. Such filters consist of particles (e.g. perlite) or other macrostructures, which contain micropores. Macropores are formed between the particles. These filters generally may have a higher rate of flow through the filter, because the pollutants are trapped in the micropores, whereas the main flow is through the macropores. These filter units are inherently non-uniform, because the size of the macropores is determined by the dimensions of the particles/structures containing the micropores. Thus there is a risk that pores of too great size are created through the layers so that polluted liquid can run through the filter without coming into contact with the micropores. This may especially be the case along the outer boundaries of the filter layer, e.g. along the side of a container housing the particles/structures. In such a filter, it is not possible to place a sorbent of choice in the micropore region and the filter therefor cannot be adapted to remove a pollutant of choice. Neither is it possible to create a hydraulic conductivity of choice; it will always depend on the size of the filter particles/structures.

U.S. Pat. No. 6,080,307 (ABTECH INDUSTRIES) discloses a storm drain insert with a separate collection system for oil and other hydrocarbons. The filter-material consists of a copolymer of thermoplastic polymers such as styrene-butadiene-styrene. The filter-material according to one embodiment is formed as a cylindrical body with a centrally placed hole along its longitudinal body. The cylindrical bodies may have numerous fissures to increase the effective surface of the body.

U.S. Pat. No. 5,788,849 (HUTTER & PROBST) discloses a filter unit containing several filter components, wherein the filter components are placed in a horizontal orientation and thereby perpendicular to the direction of flow of the water. The hydraulic conductivity of such a filter unit is determined by the hydraulic conductivity of the filter component with the smallest pore size, thus the hydraulic conductivity can not be chosen freely. As filter materials with a high absorptive capacity inherently have a low hydraulic capacity a filter unit based on this design has a low hydraulic conductivity.

U.S. Pat. No. 5,776,567 (PACTEC INC.) discloses a multi-layer filter for separating solid and liquid wastes. In a preferred embodiment the filter includes four layers. The first layer may be a network of parallel strands. The second layer may be a fibrous mat, the third layer a netting like the first layer and the fourth layer a porous filter cloth. During use, water passes sequentially through the layers under the force of gravity and water without solids can be drained from the bottom of the filter. As in other multi-layered filters, the hydraulic conductivity of the filter unit is determined by the layer having the lowest conductivity. Filter-material with a low hydraulic conductivity cannot be used for such a filter.

U.S. Pat. No. 5,632,889 (THARP) discloses a filter cartridge for separating liquid hydrocarbons from water. The filter cartridge comprises perlite particles which have been treated with a silicone. Runoff water may percolate through a body of particulate perlite so that hydrocarbons are absorbed by the perlite particles and pure water can be drained from the bottom of the filter. One disadvantage of this filter unit is that it is confined to perlite particles and therefore not useful for removing pollutants, which are not absorbed by perlite. Furthermore, as pointed out above there is a potential risk that larger pores are created through the layer, so that part of the liquid bypasses the filter without coming into contact with the inside of the perlite particles.

U.S. Pat. No. 4,761,232 (POREX TECHNOLOGIES CORP.) discloses a macroporous polyethylene substrate defining a network of interconnecting macropores and a microporous matrix of polyvinyl chloride, which completely fills the network of macropores. This filter has many features in common with the perlite filter disclosed in U.S. Pat. No. 5,632,889 since it also consists of a network of intermingled macro and micropores. One drawback of such a filter layout is that the microporous matrix cannot be removed independently from the macroporous substrate, when the absorptive capacity of the former is exhausted. Furthermore, the whole filter has to be exchanged as soon as the absorptive capacity of the micropores has been exhausted in just one location.

U.S. Pat. No. 5,980,761 (BOISSIE ET AL) discloses a filter unit being cylindrical or frustoconical and containing pozzolan as a particulate filter material. The water to be filtered may pass in a direction both vertically through the unit and in a horizontal direction. In the case of two or more different filter materials, the water passes sequentially through the layers. Thus the filter is a special embodiment of a traditional multi-layered filter.

Definitions

Convective layer—is defined according to the present invention as a layer designed to conduct fluid to be changed, either in substance composition or otherwise. It is an open structure that allows the fluid to flow through the filter unit. In the layout of the convective layer there will be a main direction of flow along one axis. In most embodiments, the convective layer is given a high hydraulic conductivity and a flat shape (e.g. in the shape of a sheet having a defined maximal thickness) in order to allow for effective transfer of substances or other features between the convective layer and the receiving layer. The axis of main direction of flow in the convective layer is perpendicular to the smallest dimension of the layer (i.e. the height of a sheet), and thus parallel to either the length or the width dimensions of the layer.

Receiving layer—is defined as a layer adjacent to at least one convective layer and designed to receive substance(s) from the fluid in this convective layer without being percolated by the fluid. Additionally, the receiving layer can be designed to enrich a fluid in the convective layer with substance(s). The receiving layer can be made to accumulate substance(s), transform or degrade substance(s), transfer substance(s), or release substance(s) or to otherwise affect the composition or other characteristics, e.g. temperature, of the fluid in the convective layer. The receiving layer can itself consist of several layers with different functions. The fluid in the receiving layer can either be the same fluid as in the adjacent convective layer, or another fluid. The fluid in the receiving layer can be stagnant, in which case the receiving layer is a stagnant layer, or mobile. If the fluid in the receiving layer is mobile it flows at a rate different from the flow rate of the fluid in the convective layer, and/or the main direction of flow in the receiving layer is different from the main direction of flow in the convective layer.

Filtering material—is used to describe a material placed within the receiving layer. The functioning of the filtering material is to to hold back, transform or degrade substance(s) from the fluid in the convective layer, or to support transfer of substance(s) from the convective layer. Additionally, the filtering material can be used to provide substance(s) to enrich or feed a fluid in the convective layer.

Substance(s)—is used to describe target substances, i.e. substances of interest regarding the fluid in the convective layer, either substances to be removed from the fluid, e.g. contaminants or pollutants, or substances to enter the fluid. Substances comprises any organic and/or inorganic solute in continuous or discontinuous phase, any organic and/or inorganic particle irrespective of size, and any organism, that can be transferred between the fluid in the convective layer and the receiving layer, and for which a receiving layer can be designed.

Mixing-zone mass flow—is used to describe the phenomenon that a fraction of the fluid in the convective layer change place with a fraction of fluid in the receiving layer due to turbulent occurring at the interface between convective layer and receiving layer.

Mixing-zone—is used to describe the area where mixing-zone mass flow takes place.

Sandwich filter—is used to describe all layers of a device or a part of a device comprising at least two layers comprising at least one receiving layer and at least one convective layer. A sandwich filter can comprise different numbers of receiving layers and convective layer e.g. two receiving layers and one convective layer.

Stacks of sandwich filters can be stacks of similar sandwich filters or stacks of different sandwich filters. When sandwich filters are stacked two receiving layers or two convective layers or one receiving layer and one convective layer becomes the adjacent layers of the two sandwich filters.

Filter unit—is used to describe an entire unity of a device based on the invention, thus a filter unit comprises at least one receiving layer and at least one convective layer. A filter unit can comprise any number of sandwich filters. Preferred is when a liquid and/or gas impermeable material surrounds a filter unit, although this is not a requisite. Two of more filter units can be combined or connected e.g. to obtain specific fluid treatment characteristics. Also an impermeable or semi-permeable layer e.g. an impermeable or semi-permeable membrane can be placed between two or more sandwich filters of the filter unit.

SUMMARY OF INVENTION

Disclosed is a method and a device for removal of substance(s) from a fluid and/or enriching a fluid with substance(s) comprising i) providing a filter unit comprising at least one convective layer and at least one receiving layer adjacent one another, ii) passing the liquid or gas through the filter so that the main direction of flow is along the layers and the main flow of fluid is in the convective layer, allowing the substance(s) of interest to: a) be transferred from the convective layer to a receiving layer, and b) be retained, transferred further, degraded or otherwise modified within the receiving layer, or c) be released from or otherwise provided by the receiving layer, and d) be transferred from the receiving layer to a convective layer. Completion of step a) and b) results in removal of substance(s) from the fluid. Completion of step c) and d) results in enrichment of the fluid with substance(s).

A fluid can thus be depleted or enriched with any substance(s) that can be transferred by diffusion, sedimentation and/or mixing-zone mass flow according to the present invention. Substance depletion includes any solute and particle small enough to enter the convective layer for which a receiving layer can be designed. Receiving layers designed for solute depletion can be based on e.g. adsorption, absorption, precipitation, degradation or transfer to another fluid system. Receiving layers designed for particle depletion can be based on straining and sedimentation in case of colloidal particles and sedimentation in case of larger particles. Depletion of organic particles can additionally be based on degradation. Receiving layers designed for substance(s) enrichment can be based on dissolution of a solid phase, chemical or microbial production, or supply from an external system connected to the receiving layer.

It is one object of the invention to provide a fluid treatment method where the filter unit has a high and from the filtering material independently determined hydraulic capacity during the whole lifetime of the filter unit and yet providing good and flexible conditions for depletion or enrichment of the fluid with substance(s) of interest.

Disclosed is also a filter unit for filtering liquid or gas, said filter unit comprising i) at least one convective layer, ii) at least one stagnant layer adjacent said convective layer, iii) at least one impermeable layer preventing the flow of liquid or gas through the layers in a direction perpendicular to the layers and sequentially through the layers.

The disclosed filter units are especially suitable for treating huge amounts of fluids per unit time, especially fluids that should be depleted of both solutes and particles. The filter units can be used for enriching or depleting any fluid with any substance(s) for which an adequate receiving layer can be designed, preferred is filtering wastewater for solutes and suspended solids, such as storm water runoff, including urban runoff, highway runoff and other road runoff; sewage stormwater overflow; polishing of effluent from spillage water treatment plants; filtering groundwater contaminated with nitrate, pesticide(s), MTBE, chlorinated compounds or otherwise contaminated groundwater; removal of suspended solids from surface water, e.g. as a pre-treatment if the surface water is to be UV-radiated, ozonated or chlorinated in order to be used as drinking water; remediation of natural aquatic environments, e.g. filtration of a polluted lake, stream or river, but also industrial waste water can be filtered, as well as the filter unit can be adapted to enrich fluids in industrial processing or other processing with specific substances.

The filter units can be designed to be used for long periods. If the capacity of the filtering material for depleting or enriching the fluid in the convective layer has been used, it may in many cases be possible to renew the capacity either currently, e.g. by designing the receiving layer to continuously release its content of trapped sediment to an external container, or once in a while in that a new portion of filtering material, e.g. for retaining heavy metals, can be applied in a suspension to the filter unit by means of the convective layer and allowed to sediment into the receiving layer, or the convective layer can be used to transfer a fresh coating to the filtering material. If the receiving layer contains a mobile fluid connected to an external system from which the depletion or enriching ability of the receiving layer is achieved there is no time limit to the lifetime of the filter, providing that the materials supporting the filter unit, e.g. surrounding membranes etc. can last. If the capacity is non-renewable and the filter unit has accumulated contaminants or other hazardeous substances or organisms, the filter unit can either be removed from the area and the contaminants taken care of in a proper way, or the inlets and outlets structures of the filter unit can be blinded, to prevent fluid from entering the filter unit, in this way turning the filter unit into a deponi.

Other applications of the filter unit can be used for filtering gas such as flue gas, waste gas, exhaust gas. Also oil under fluid conditions can be treated.

Other applications of the filter unit can be used for treatment of contaminated soil or other solids than can be turned into a slurry, capable of flowing through the convective layer.

Other applications of the filter unit can be used for removal of salt from sea-water providing the receiving layer can be designed to evaporate and condense the water in separate layers, e.g. by means of energy from the sun to evaporate sea-water in process one, and chilliness of sea-water to cause a condensation of water depleted its salt in process two.

d) Simple extrapolation of T1 removal trend line to intersection with abscissa.

FIG. 13: Retention of natural clay (T1) in small and large filter-cells during recycled flow.
- a) Relative concentration of T1 natural clay in effluent during recycling of 1 L for 17 hours in small filter-cell at a specific flow rate of 2 cm/min. Linear trendline shown with equation.
- b) Relative concentration of T1 natural clay in effluent during recycling of 6.6 L for 24 hours in large filter-cell at specific flow rate of 60 cm/min.

Figure 14A:
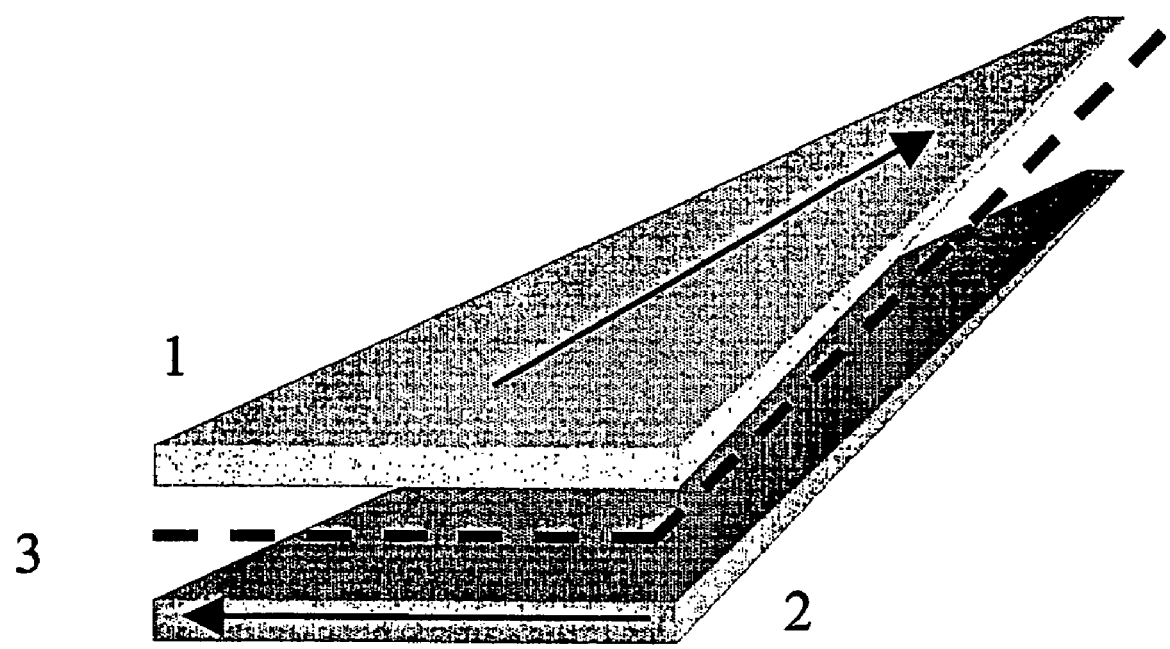
Figure 14B:
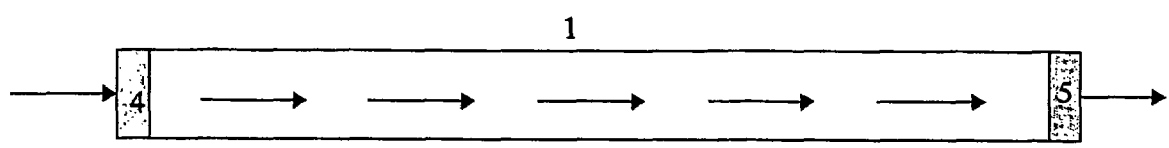
Figure 14C:
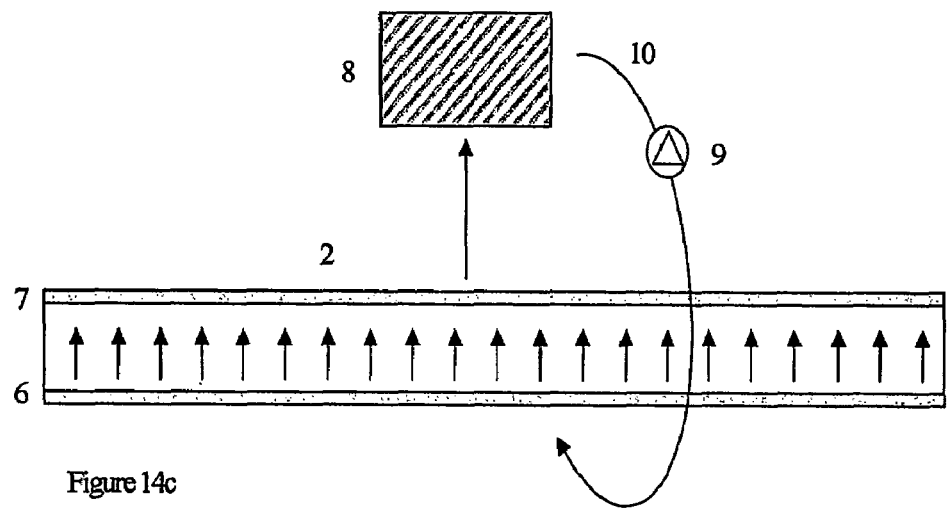

FIG. 14 Principle illustration of a dual porosity filter designed for nitrate removal. 1) Convective layer. Arrows indicate main direction of flow. 2) Receiving layer. Main direction of flow, perpendicular, but still parallel to the main direction of flow in the convective layer. It is to be understood that the convective layer, the bacteria membrane, and the receiving layer are adjacent.
- a) The convective layer (1) is seen to lie above the receiving layer (2). Between the convective layer and receiving layer is placed a bacteria proof membrane (3).
- b) The convective layer (1) viewed from above. Main direction of flow is along the filter. 4) Inlet structure. 5) Outlet structure.
- c) The receiving layer (2) seen from above. Main direction of flow is shown by arrows. 6) Inlet structure. 7) Outlet structure. 8) Carbon-source container. 9) Pump for recycling. 10) Tubing.

Figure 15A:
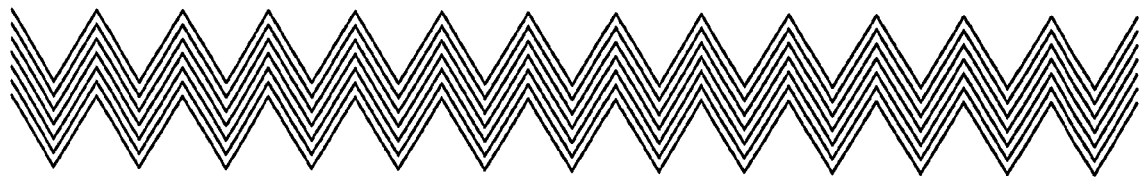
Figure 15B:
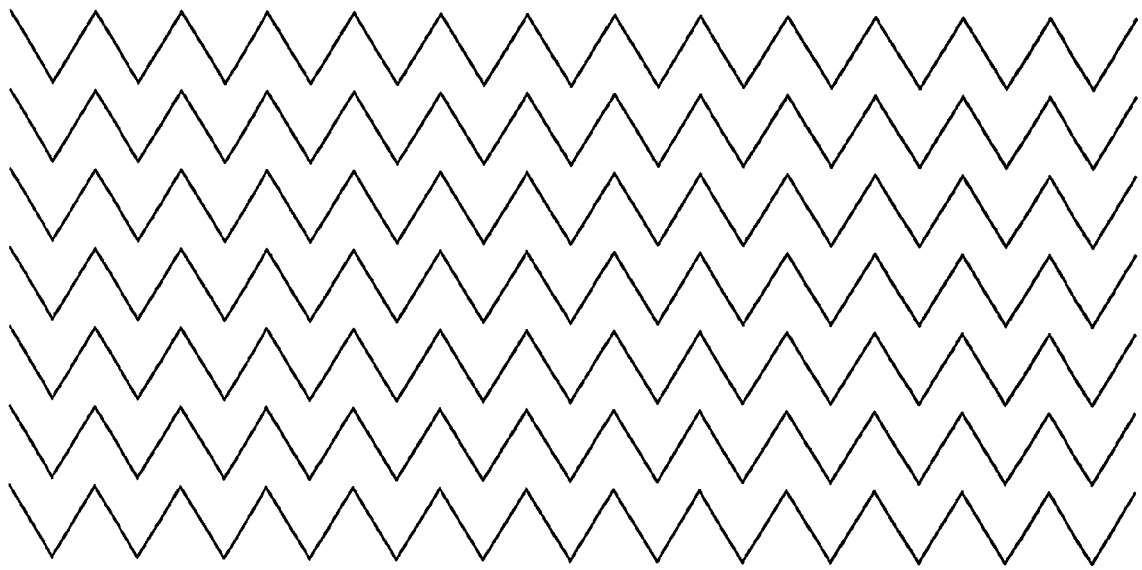
Figure 15C:
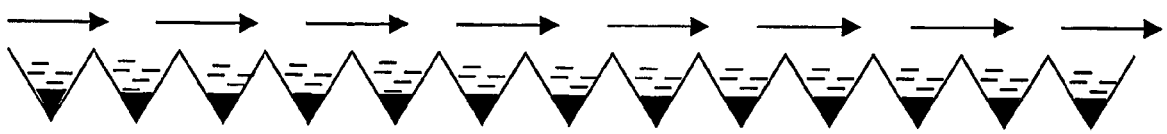

FIG. 15: Principle outline of a dual porosity filter adapted to suspended solids removal. Cross-section parallel to the main direction of flow.
- a) Empty filter unit. Receiving layers with ridges and valleys lying adjacent to one another. For purposes of transport it may be convenient to roll the stack.
- b) Filter unit water filled. Entering water forces the adjacent receiving layers apart, in this way creating a convective layer. Sutures or other features partly combining adjacent receiving layers determine the width to which the receiving layers can be parted by entering water.
- c) A single receiving and convective layer shown. Arrows indicate the main direction of flow in the convective layer. In the valleys of the receiving layer stagnant water constitute a trap for solids carried in the convective layer. Solids accumulated at the bottom of the receiving layer shown by black triangles.

Figure 16:
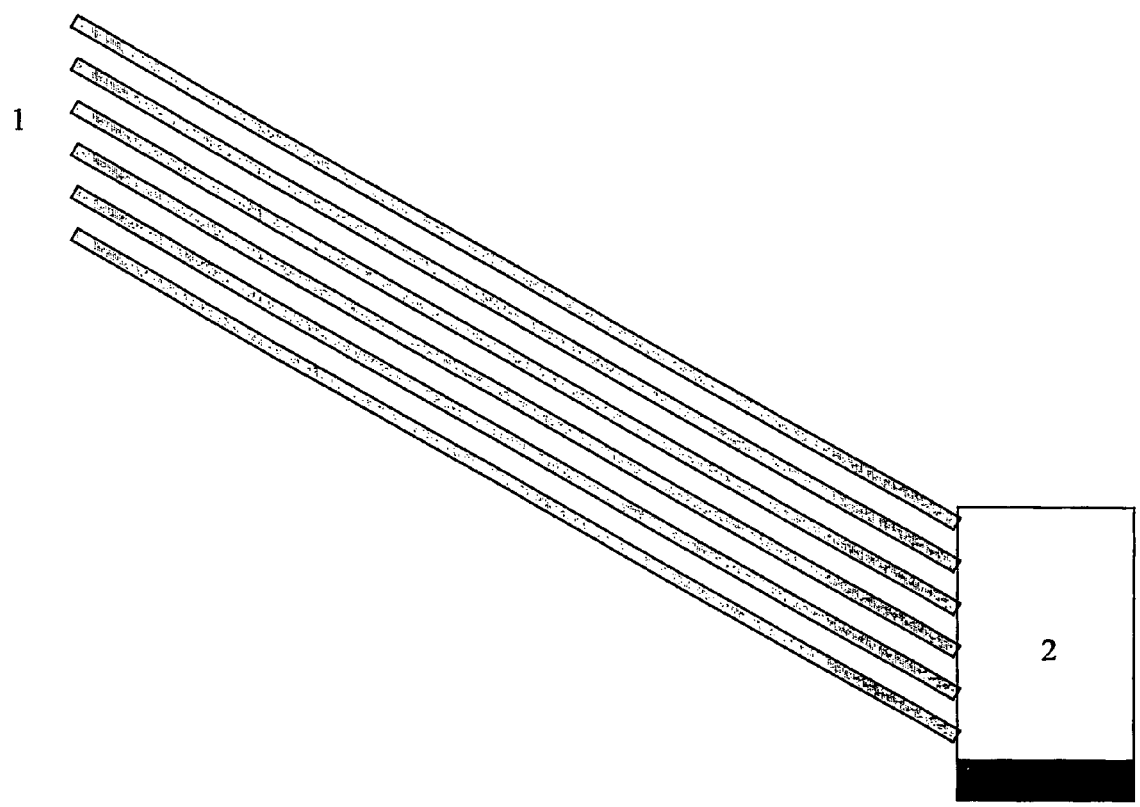

FIG. 16 Dual porosity filter adapted to suspended solids removal and designed to be self-cleaning by means of tilted receiving layers. Cross-section perpendicular to the main direction of flow. 1) Stack of receiving-layers (grey) parted by convective layers (white). Suspended solids gather at the bottom of the receiving layers and moves due to gravity in the valley to the 2) furrow along the filter from where it may be sampled or removed. Solids accumulated in furrow shown with black box.

Figure 17:
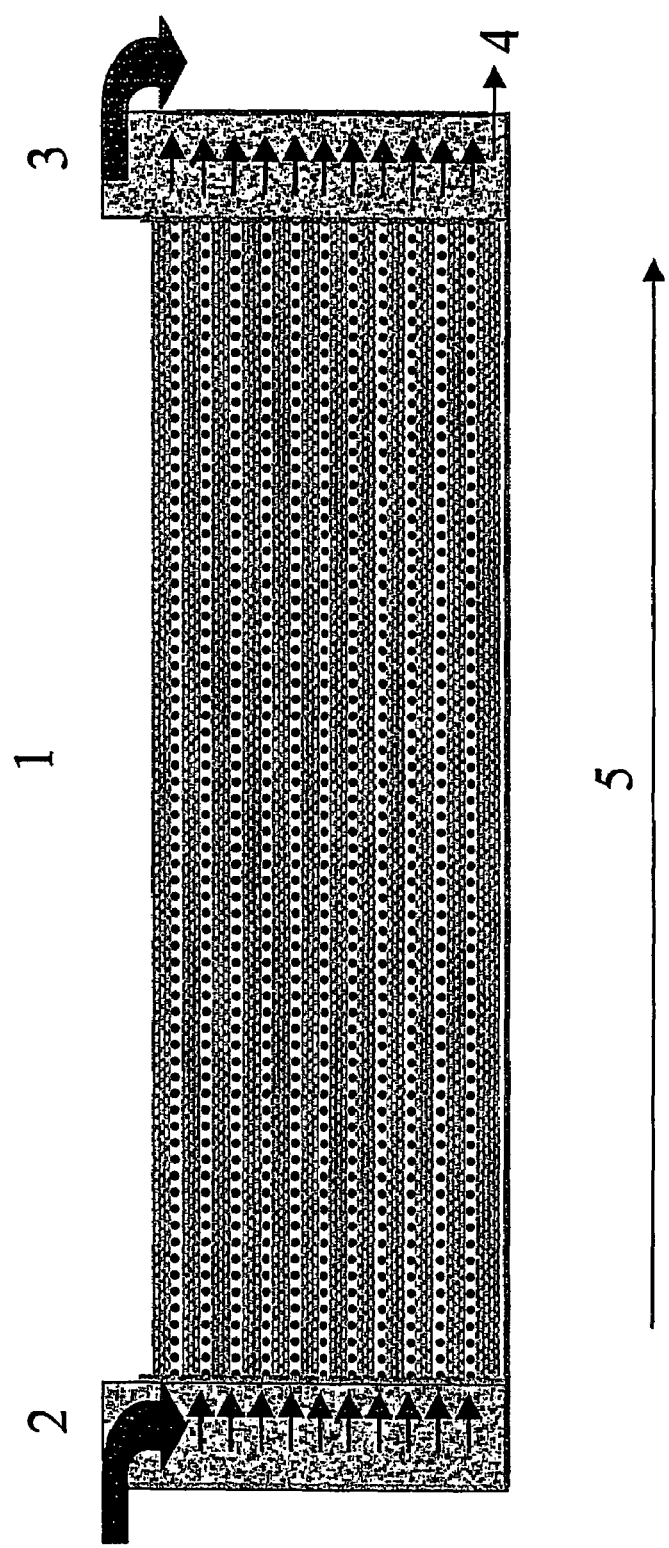

FIG. 17: Illustration of a filter unit designed for removing heavy metals and suspended solids from road runoff. Cross-section parallel to the main direction of flow. 1) Stack of sandwiches comprising alternating layers of receiving layer and convective layer (dotted line). 2) Inlet structure. 3) Outlet structure. 4) Reduced outlet to allow for complete emptying of filter unit. 5) Main direction of flow.

DETAILED DESCRIPTION OF THE INVENTION

Disclosed is a method and a device for removal of substance(s) from a fluid (liquid or gas) and/or enriching a fluid with substance(s) comprising i) providing a filter unit comprising at least one convective layer and at least one receiving layer adjacent one another, ii) passing the liquid or gas through the filter so that the main direction of flow is along the layers and the main flow of liquid or gas is in the convective layer, allowing the substance(s) of interest to: a) be transferred from the convective layer to a receiving layer, and b) be retained, transferred further, degraded or otherwise modified within the receiving layer, or c) be released from or otherwise provided by the receiving layer, and d) be transferred from the receiving layer to a convective layer.

Accordingly, there is provided a filter-unit, wherein the filtering material is not percolated by the fluid, but merely is adjacent to the fluid. The fluid to be treated is conducted in the convective layer along the receiving layer that may or may not contain a filtering material. Substances are removed from the fluid when 1) transferred to the receiving layer and 2) retained or otherwise removed from the fluid phase in the receiving layer. Substances enter the fluid when 1) the receiving layer provides the substances to the fluid in the receiving layer, and 2) the substances are transferred from the receiving layer to the convective layer.

In an embodiment there is provided a filter, wherein the filter medium is not percolated by the fluid, but merely is adjacent to the fluid. The fluid (gas or liquid) to be purified is conducted in the convective layer along the receiving layer containing the filter medium. Pollutants are removed from the fluid when 1) transferred to the receiving layer followed by 2) retention in the receiving layer proceeds successfully.

Transfer of substances between fluid in convective layer and fluid in receiving layer can proceed through mixing-zone mass flow, diffusion and sedimentation. The direction of the transfer process determines whether the fluid in the convective layer is being depleted of or enriched with substance(s).

The receiving layer typically contains filtering material(s) to withhold or provide, or otherwise support, the substance(s) to be exchanged with the fluid in the convective layer.

Retention of substances received in the receiving layer can occur by adsorption, absorption, sedimentation, precipitation, straining (physical capture of macromolecules or colloidal particles in pores of a appropriate filtering material) and/or any other physical-chemical reactions between a solute and a appropriate filtering material placed in the receiving layer. Other removal mechanisms include microbial or other types of full and partly degradation, chemical or biological modification. In special cases the receiving layer merely allows substance(s) that are to be depleted from the fluid to pass through the receiving layer, e.g. in order to be picked up by another fluid flowing through the convective layer of another filter unit, or the fluid in the receiving layer may itself be mobile and thus being able of transporting the substance(s) to an external system.

The ability of the receiving layer to provide substance(s) to enrich a fluid in the convective layer can be based on dissolution processes, chemical reaction products, microbial product, and/or external supply, and/or any other production mechanism.

Apart from mixing-zone mass flow, which may take place in the peripheral part(s) of the receiving layer (as described elsewhere herein), convective flow of fluid into the receiving layer is insignificant, or restricted to specific designs or functions of the filter, e.g. alternating high and low flow conditions, or re-saturation of the filter after dewatering.

The different transfer mechanisms affect different types of substances. Mixing-zone mass flow acts on all types of substances carried in the fluid. Diffusion and diffusion-like processes act on solutes and colloidal particles. Sedimentation acts on particles capable of sedimentation in the fluid in the convective layer under the given conditions, which roughly spoken are equal to suspended solids with a specific weight greater than the specific weight of the fluid.

Surprisingly, relatively higher removal rates have been observed at higher flow rates than expected from removal rates observed at lower flow rates. This is ascribed to the mixing-zone mass flow being more effective at higher flow rates than at lower, and thus to some extent counteract for the shorter residence time at higher flow rates.

One prominent advantage of the filter unit according to the present invention is that a high hydraulic capacity can be achieved irrespective of the filtering material used and irrespective of substance load and composition of the fluid. This is due to the fluid not having to percolate the filtering material in order to be treated, and the possibility for giving the convective layer a hydraulic conductivity of choice. It is thus possible to treat huge amounts of liquid or gas and still use a filter material with a very low hydraulic conductivity. Also it is possible to treat fluids with a high content, or alternating high and low contents of suspended or dispersed solids. It is also possible to dimension the filter to have a low hydraulic capacity where this is desired or useful.

By retaining the pollutants along the direction of flow in a separate layer the classical problem with clogging of the filter is avoided. Thus, the initial hydraulic conductivity of the filter is maintained through out the entire lifetime of the filter.

Another advantage of introducing a specific convective layer in the filter unit is that the energy needed for driving the fluid through the filter is low. Thus, in many cases the fluid may be driven by gravity. In other cases, a pump may be used to drive the fluid through the filter unit.

By appropriate design of the receiving layer a filter unit is provided that simultaneously combats solutes and small particles. The receiving layer must contain a appropriate filtering material and/or be given an appropriate structure/build-up in order to retain, transfer or degrade solutes and further it must allow for storage and/or degradation of colloidal and larger sized particles.

By separating the receiving layer, i.e. the layer that is to modify the substance composition and/or other characteristics of the fluid, from the convective layer, i.e. the main flow, the choice of filter material is rendered more freely, since the hydraulic conductivity of the filter unit is independent of the hydraulic conductivity of the filtering material. For this reason, filtering materials with low hydraulic conductivity and also filters which do not have the structure to be e.g. self supporting can be used provided that the convective layer has the required structure, and still result in a filter unit with a high hydraulic conductivity.

In a stacked design of alternating convective and receiving layers, a filter can be built, where individual layers serve individual purposes. Receiving layers with different features can be built into the same filter. Also different convective layers can conduct different fluids, which can interact through the receiving layers. Altogether this gives a very flexible purification device that can be given almost unlimited designs.

The invention provides a filter alternative that treats equally well fluids with high and low, or even alternating, pollutant loads. Thus, the influent pollutant concentrations will always be reduced by the same factor on leaving the filter; irrespective of the input concentration providing an appropriate filtering material can be identified. If a higher reduction factor is wanted the device should either be given a longer residence time by making the filter longer and/or reducing the hydraulic gradient, or the height (thickness) of the convective layer or layers should be reduced, thereby providing a relatively wider mixing zone, a shorter diffusion distance and a shorter sedimentation distance. However, it is important to note that the transfer mechanism associated with mixing-zone mass flow to some extent seem to counteract residence time, assumable due to a greater fraction of the water volume in the convective layer is involved in mixing-zone mass flow at higher flow rates.

The Transfer Mechanisms

Figure 1A:
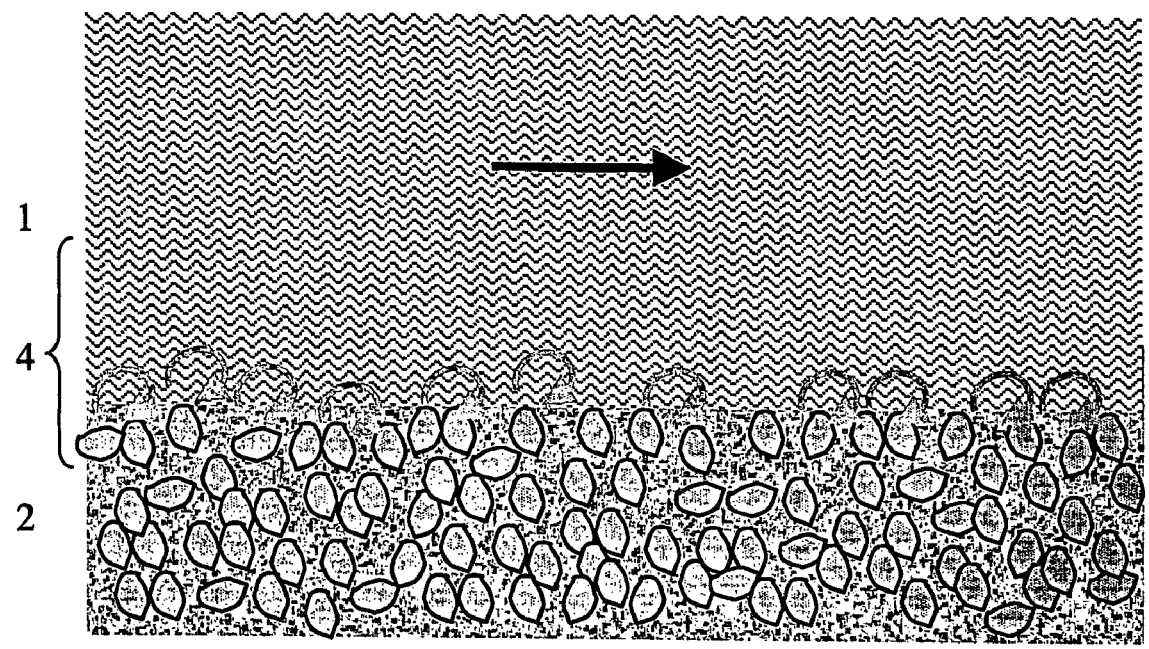
FIG. 1: Schematic representation of mechanisms assumed to count for transfer of pollutants from fluid in convective layer into receiving layer in dual porosity filtration.
 a) Cross-section showing one convective layer above one receiving layer. The figure illustrates the principle of pollutant transfer through mixing-zone mass flow. 1) Convective layer with polluted fluid (pollutants not shown). 2) Receiving layer with filtering material. 3) Main direction of flow in convective layer. 4) Mixing-zone. Arrows illustrate turbulent causing mixing-zone mass flow.
 b) Cross-section showing one convective layer between two receiving layers. The figure illustrates the principle of pollutant transfer through diffusion. 1) Receiving layer with filtering material. 2) Convective layer with polluted fluid. Pollutants illustrated by black dots. 3) Main direction of flow. 4) Directions of diffusion, providing both adjacent receiving layers are open for diffusion of the pollutants present. 5) Maximum diffusion distance.
 c) Cross-section showing one convective layer between two receiving layers. The figure illustrates the principle of pollutant transfer through sedimentation. 1) Receiving layer with filtering material. 2) Convective layer with polluted fluid. Pollutants illustrated by line fragments and droplet shaped figures. 3) Main direction of flow in convective layer. 4) Direction of sedimentation. 5) Maximum sedimentation distance.

The working principle of the filter units and methods according to the invention is illustrated with reference to FIGS. 1a, 1b and 1c. In FIG. 1a is illustrated the working principle of the filter unit for transfer of all kind of substances in the fluid by means of mixing-zone mass flow. A cross section of a filter unit with one convective layer and one receiving layer is shown. At the interface between the convective layer and the receiving layer some mixing of fluid from the two layers will take place. A fraction of the fluid flowing in the convective layer will change place with a fraction of the fluid in the receiving layer, referred to as "mixing-zone mass flow". Hereby the fluid is brought into intimate contact with the surfaces of any filtering material placed in the receiving layer, and further it is brought to mix with a fraction of the fluid present in the receiving layer. The mixing-zone mass flow in this way favours the exchange of substances between fluid in the convective layer and the receiving layer. The thickness of the mixing-zone is assumed to increase with increasing flow rate.

Figure 1B:
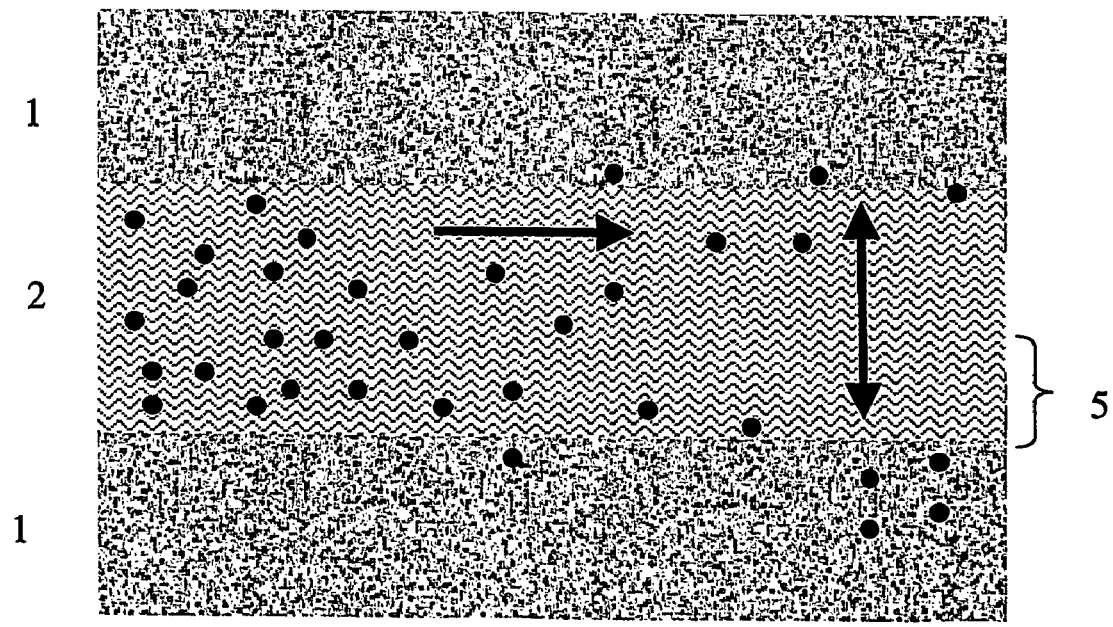

In FIG. 1b is shown the working principle of the filter for transfer of solutes and colloidal particles by means of diffusion. A cross section of a filter unit with one convective layer and two receiving layers is seen. The receiving layers are separated by distance "d", being equal to the thickness of the convective layer. Solute(s) and/or colloidal particles in a fluid can be transferred to the receiving layers by means of diffusion if the concentrations of the solute(s) and/or colloidal particles in the fluid of the receiving layer is lower than the concentrations in the fluid in the convective layer, in that solute(s) and colloidal particles due to Brownian movements move from volumes with high to low concentrations. If both adjacent receiving layers are open for diffusion, the maximum distance that the solute(s) and/or colloidal particles will have to diffuse to reach a receiving layer is ½d, i.e. the maximal diffusion distance is ½d. If only the below receiving layer is open to diffusion the maximum diffusion distance is d. The diffusion process is effected by the mixing-zone mass flow however the direction for diffusion will always be from high to low concentration.

Figure 1C:
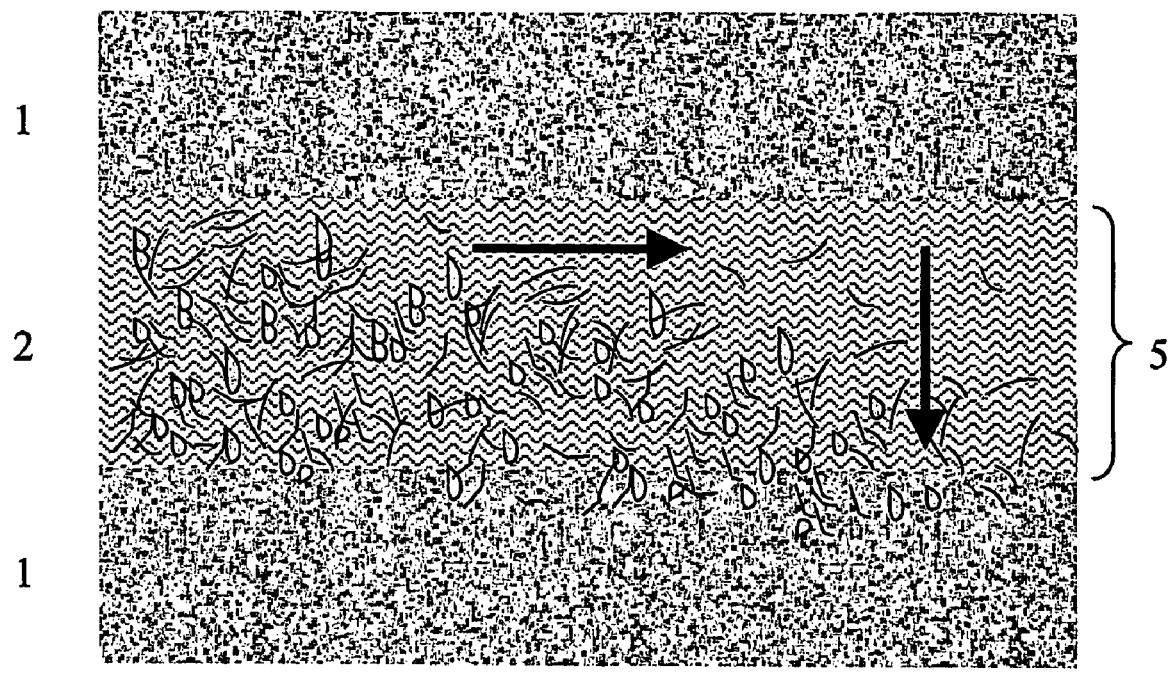

In FIG. 1c is illustrated the working principle of the filter unit for transfer of suspended particles by means of sedimentation. The layout of the filter unit of FIG. 1c is the same as for FIG. 1b. The suspended particles can only sediment in the direction of gravity, i.e. to the receiving layer below the convective layer. The suspended particles have to move a maximum distance of "d" equal to the thickness of the convective layer to be caught in a receiving layer. The mixing-zone mass flow interacts with the sedimentation transfer process, however the direction of sedimentation will always be downwards (or in the direction of the gravity field).

Receiving Layer

The purpose of the receiving layer is to exchange substance(s) with fluid in the convective layer. The receiving layer is either a single structure that in its own layout provides the wanted features, or it is a composite structure consisting of a supporting structure and a filtering material.

If the receiving layer is a single structure the design of the structure must secure that fluid in the receiving layer largely stays separated from fluid in the convective layer (apart from mixing associated with mixing-zone mass flow). This means that the fluid in the receiving layer must either be stagnant or flow in another direction and/or at another speed through it's own inlet structure and/or outlet structure than the main direction of flow through the filter unit, i.e. the main direction of flow in the convective layer. Stagnant fluid can be obtained by confining the fluid in the receiving layer, e.g. by designing the single structure as a fluid proof or nearly fluid proof frame (to obtain almost stagnant water in the receiving layer), with or without some grid-like substructure, where the grid has a certain height, or with or without another form of substructure, e.g. folding of the structure into ridges and valleys perpendicular to the main direction of flow in the adjacent convective layer. The single structure must in all cases provide adequate conditions for exchange of substances with the fluid in the convective layer, for instance be capable of accumulating or transferring particles from the fluid.

If the receiving layer is a composite structure the supporting structure can be constructed in the same way as the single structure described above. The hydraulic conductivity of the receiving layer can additionally be modified by use of a filtering material with a desired hydraulic conductivity. As in case of the single structure, the composite structure must provide adequate conditions for exchange of substances with the fluid in the convective layer, but the adding of a filtering material results in much wider opportunities in terms of depletion and enrichment processes.

An unlimited number of organic and inorganic materials can be used in the receiving layer as filtering material(s) for depletion of substances in fluid in the convective layer, and includes but is not limited to: sand, gravel, perlite, vermiculite, anthracite, activated carbon, charcoal, diatomaceous soil, chitin, chitosan, pozzolan, lime, marble, clay, iron-oxide-coated minerals (e.g sand), double metal-hydroxides, LECA, rockwool, glass wool, zeolithes, fly ash, soil, limed soil, iron-enriched soil, bark, humus, lignin, compost, leaves, seaweed, algae, alginate, xanthate, peat moss, bone gelatin beads, moss, wool, cotton, cocos fibres, other plant fibres, and modification hereof. Even trapped sediment may in some cases serve as filtering materials for depletion of other substances, e.g. solutes.

In one embodiment filtering material(s) for depletion of substances in fluid in the convective layer comprises: sand, gravel, perlite, vermiculite, anthracite, activated carbon, charcoal. In another embodiment filtering material(s) for depletion of substances in fluid in the convective layer comprises: diatomaceous soil, chitin, chitosan, pozzolan, lime, marble, clay, iron-oxide-coated minerals, (e.g sand), double metal-hydroxides, LECA. In a further embodiment filtering material(s) for depletion of substances in fluid in the convective layer comprises: rockwool, glass wool, zeolithes, fly ash, soil, limed soil, iron-enriched soil. In yet a further embodiment filtering material(s) for depletion of substances in fluid in the convective layer comprises: bark, humus, lignin, compost, leaves, seaweed, algae, alginate, xanthate, peat moss, bone gelatin beads, moss, wool, cotton, cocos fibres.

Also bacteria and other micro-organisms, either naturally invading populations or selectively supplied populations, may be used alone or in combination with other filtering materials; as may physical and chemical products, e.g. reducing or oxidizing chemicals, enzymes, precipitation chemicals, mixed with other filtering materials or alone.

Likewise, an unlimited number of organic and inorganic natural and/or manufactured materials and organisms may be used in the receiving layer for enriching the fluid in the convective layer with substance(s).

The filtering material chosen for the receiving layer depends on the character of the substance(s) to be exchanged with the fluid in the convective layer.

Information concerning suitability of filtering materials for depletion of different substances can be found in the literature, e.g.:

Jobstmann, H. and Singh, B. 2001. Cadmium sorption by hydroxy-aluminium interlayered montmorillonite. Water, Air, and Soil Pollution 131: 203-215.

Cohen-Shoel, N., Barkay, Z., llzyucer, D., Gilath, I. and Tel-Or, E. 2002. Biofiltration of toxic elements by Azolla biomass. Water, Air, and Soil Pollution 135: 93-104.

Johansson, L. 1997. The use of Leca (Light Expanded Clay Aggregates) for the removal of phosphorus from wastewater. Water Science and Technology, 35:87-93 Ouki, S. K. and Kavannagh, M. 1997. Performance of natural zeolithes for the treatment of mixed metal-contaminated effluents. Waste Management & Research, 15:383-394.

Bailey, S. E., Olin, T. J., Bricka, R. M. and Adrain, D. D. 1999. A review of potentially low-cost sorbents for heavy metals. Water Research, 33:2469-2479.

A receiving layer can be constructed of a single or more than one filtering material. The composition of a receiving layer with more than one filtering material can be a uniform mixture of the filtering materials, or part of the receiving layer can have a higher amount of one or more filtering materials in different parts of the receiving layer. The thickness (depth) of the receiving layer is set in accordance with the amount of substance(s) it should be able to exchange with the fluid in the convective layer. In principle there is no upper limit for the thickness of receiving layer, but for practical reasons it is often kept below 50 cm. More often the thickness is kept between 1 mm and 20 cm, such as 1-2 cm, for example 2-3 cm, such as 3-4 cm, for example 4-5 cm, such as 5-6 cm, for example 6-7 cm, such as 7-8 cm, for example 8-9 cm, such as 9-10 cm, for example 10-12 cm, such as 12-14 cm, for example 14-16 cm, such as 16-18 cm, for example 18-20 cm. The dimensions for some purposes may also be kept within 20-25 cm, 25-30 cm, 30-35 cm, 35-40 cm or 40-50 cm.

Substance(s) received from or delivered to the fluid in the convective layer will in many cases accumulate more in or be depleted more from, respectively, the filtering material directly adjacent to the fluid in the convective layer. However, filtering material(s) located deeper in the receiving layer, i.e. at a greater distance from the fluid in the convective layer, will take part in the exchange processes, in that redistribution mechanisms, e.g. diffusion and migration of solutes, colloids and/or organisms, will move substances accumulated at the interface between the receiving layer and the convective layer deeper into the receiving layer, or vice-versa move substances from deeper positions to this interface to replace substances that have entered into and vanished with the fluid in the convective layer. Such redistribution mechanisms allows for the exchange capacity of the filtering material to be fully used.

A single receiving layer can be given a uniform or substantially uniform structure throughout the filter or it can be constructed of different supporting and filtering materials in different sections of the filter unit, e.g. one material at the flow inlet and another material at the flow outlet. The length of the sections can be equal or different, and the materials can be selected due to any criteria such as smaller pores at the flow outlet or different depletion or enrichment characteristics within the different sections of the layer. The number of sections can be at least 2, such as at least 3, e.g. at least 4, such as at least 5, e.g. at least 6, such as at least 7 e.g. at least 8, such as at least 9, e.g. at least 10, such as at least 15. The sections of the receiving layers as described above can each comprise a single material or more materials, these materials can be selected from the materials described elsewhere herein or can be other materials with properties of interest.

Convective Layer

The convective layer can be constructed as a simple spacing of two adjacent receiving layers, e.g. obtained by equipping the two adjacent receiving layers with small 'nails' giving just the desired spacing; or the convective layer may be empty space e.g. comprising channels for fluid; or it may be composed of a specific structure, e.g. a folded, open-structured net like the central part of the EnkaDrain. The main criterion is that a specific minimum and maximum aperture of the convective layer is provided, in order to dimension the filter unit in terms pressure head and filter length to obtain appropriate fluid retention time and/or fluid flow rate.

Where the convective layer is empty space, the receiving layers may be joined by any possible method. The receiving layers can be sewed together with more or less parallel sutures hereby the empty space between two sutures comprises a channel for fluid. The receiving layers can also be joined with scattered joins, hereby the fluid can move more freely between two receiving layers. When a filter where the convective layers comprises empty space as just described is in use, the fluid will force the receiving layers apart. By this amplification the filter can be inexpensive and as no additional physical element is build in for supporting convective flow the size of the filter unit can be reduced when the filter unit is not in use or is to be transported.

If a material is to be build in for creating a layer for supporting convective flow this material is preferably a non-absorbent, water-permeable, fibrous mesh material formed with circuitous (non-linear) pathways therethrough. The material is preferably a mass of random filament-type plastic fibers with a density, which is sufficient to support the filter unit without significant collapse, but allow water to pass freely therethrough. A possible embodiment of the material is a polyethylene or polyester fibrous mesh such as ENKAD-RAIN E8004H75-2s/D110P manufactured by Colbond Geosynthetics, Arnhem, the Netherlands. Another material is FIBERBOND EM 6645 manufactured by Fiberbond in Michigan City, Ind. The material may be of two or more different materials or layers.

In some instances, a more open fiber-material will be desired. One such material is KemWove 8643, available from KemWove. The material is described in U.S. Pat. No. 5,423,992, incorporated herein by reference.

The convective layer may alternatively comprise a mass of open-structured plant fibers with a strength, which is sufficient to support the filter unit without significant collapse, but allow water to pass freely therethrough. Plant fibers can be pressed into a form-stable mat and the use of such materials can be very interesting for relatively short-lived filters. Suitable plant fibers include but are not limited to bark, chunk-wood, chip-wood, straw, cocos fibre etc.

The thickness of the convective layer is selected in dependency of maximum size of the particles that has to enter the filter unit, the residence time in the filter unit and the flow rate of the fluid. The thickness of the convective layer is normally considerably lower than the receiving layer, in order to keep the transfer distance as low as possible. In a filter for liquids the thickness is normally kept within 1 mm to 5 cm, more preferably between 1 mm and 3 cm, such as 1 mm to 2 cm, more preferably below 1 cm, such as 9 mm, 8 mm, 7 mm, 6 mm, 5 mm, 4 mm, 3 mm, 2 mm. In a filter for gas filtration the dimensions of the convective layer is considerably lower and is normally kept within 0.1 mm and 2 mm.

The convective layer can be constructed of one or more materials in a similar way as described above for the receiving layer especially according to sections and number of materials.

The convective layer need not be of uniform or substantially uniform thickness throughout the filter unit. The convective layer may be thinner or thicker through the filter in order to decrease or increase the residence time of the fluid including substances through the filter unit.

Filter Layout

The physical layout of the filter unit, in its simplest form is one convective layer adjacent to one receiving layer. In order to increase the capacity of the filter unit it may be built up in a sandwich form, with one convective layer sandwiched between two receiving layers. In this way sustances can be exchanged through diffusion and mixing-zone mass flow in two directions. A further increase in capacity is obtained by using a stacked form, with many alternating layers of convective and receiving layers. A further embodiment of the filter unit is a stacked form with different purpose alternating layers of convective and receiving layers.

A stacked form can be made simply by stacking the alternating layers, but it can also conveniently be made by rolling a filter unit with one convective layer surrounded by one or two receiving layers and thus obtain a filter roll.

A sandwich filter may be stacked to increase the capacity and the throughput. At a given pressure head the higher the number of convective layers and receiving layers in the stack, and/or the wider the stack, the higher the capacity and the higher the throughput. A filter unit may thus comprise a stack of sandwich filters, the stack comprising at least 2 sandwich filters, such as at least 3 sandwich filters, for example at least 4 sandwich filters, such as at least 5 sandwich filters, for example at least 6 sandwich filters, such as at least 7 sandwich filters, for example at least 8 sandwich filters, such as at least 9 sandwich filters, for example at least 10 sandwich filters, such as at least 12 sandwich filters, for example at least 15 sandwich filters, such as at least 20 sandwich filters, for example at least 25 sandwich filters, such as at least 50 sandwich filters, for example at least 75 sandwich filters, such as at least 100 sandwich filters, for example at least 125 sandwich filters, such as at least 150 sandwich filters, for example at least 175 sandwich filters, such as at least 200 sandwich filters, for example at least 225 sandwich filters, such as at least 250 sandwich filters, for example at least 275 sandwich filters, such as at least 300 sandwich filters, for example at least 325 sandwich filters, such as at least 350 sandwich filters, for example at least 400 sandwich filters, such as at least 450 sandwich filters, for example at least 500 sandwich filters.

The composition of a filter with layers of receiving layers and convective layers can be any composition with at least one receiving layer and at least one convective layer. The entire filter unit or units comprising sandwich filters, which each can be repeated or can be combined two or more sandwich filters within one filter unit, can be, but is not limited to the composition:

1 receiving layer and 1 convective layer
1 receiving layer, 1 convective layer and 1 receiving layer
1 receiving layer and 2 convective layers
1 receiving layer and 3 convective layers
1 receiving layer and 4 convective layers
2 receiving layers and 1 convective layer
2 receiving layers and 2 convective layers
3 receiving layers and 1 convective layers
3 receiving layers and 2 convective layers
3 receiving layers and 3 convective layers wherein the materials and/or other characteristics of the upper receiving layers and convective layers are or are not equal to the materials and/or other properties of the lower receiving layers and/or convective layers, and wherein the different properties of the receiving layers and convective layers are chosen in accordance to the fluid with substance(s) to be filtered or provided.

The sandwich filters described above can be separated by fluid impermeable layers e.g. membranes when stacked. The impermeable layer or membrane can be placed according to description elsewhere herein.

A filter unit according to the invention may also comprise a stack of alternating convective/receiving layers to increase the capacity and throughput. The filter unit may thus comprise a stack of at least 2 convective/receiving layers, such as at least 3 layers, for example at least 4 layers, such as at least 5 layers, for example at least 6 layers, such as at least 7 layers, for example at least 8 layers, such as at least 9 layers, for example at least 10 layers, such as at least 12 layers, for example at least 15 layers, such as at least 20 layers, for example at least 25 layers, such as at least 50 sandwich filters, for example at least 75 sandwich filters, such as at least 100 sandwich filters, for example at least 125 sandwich filters, such as at least 150 sandwich filters, for example at least 175 sandwich filters, such as at least 200 sandwich filters, for example at least 225 sandwich filters, such as at least 250 sandwich filters, for example at least 275 sandwich filters, such as at least 300 sandwich filters, for example at least 325 sandwich filters, such as at least 350 sandwich filters, for example at least 400 sandwich filters, such as at least 450 sandwich filters, for example at least 500 sandwich filters.

In a filter unit where there is a flow in the receiving layer this flow must be controlled through inlet and outlet structures separate from the inlet and outlet structures used for the fluid to be treated, i.e. the fluid in the convective layer.

A stacked filter is preferably separated from the surroundings, e.g. the ground, by a water-impermeable layer. In some embodiments the impermeable layer surrounds the filter unit to seal it from the surroundings on all surfaces except the inlet and outlet.

A stacked filter can have any dimension according to height, width and length. The height of the filter unit described elsewhere herein is at least 0.1 cM, such as at least 0.5 cM, e.g. at least 1 cM, such as at least 5 cM, such as at least 10 cM, e.g. at least 15 cM, such as at least 20 cM, such as at least 30 cM, e.g. at least 50 cM, such as at least 1 M, such as at least 2 M, e.g. at least 5 M, such as at least 10 M, such as at least 15 M, e.g. at least 20 M, such as at least 25 M, such as at least 30 M, e.g. at least 50 M, such as at least 75 M, such as at least 100 M. The preferred height is at least 0.5 M. More preferred is a height of at least 1 M. Most preferred is a height of at least 2 M.

The width of the filter unit described elsewhere herein is at least 0.1 cM, such as at least 0.5 cM, e.g. at least 1 cM, such as at least 5 cM, such as at least 10 cM, e.g. at least 15 cM, such as at least 20 cM, such as at least 30 cM, e.g. at least 50 cM, such as at least 1 M, such as at least 2 M, e.g. at least 5 M, such as at least 10 M, such as at least 15 M, e.g. at least 20 M, such as at least 25 M, such as at least 30 M, e.g. at least 50 M, such as at least 75 M, such as at least 100 M, e.g. at least 150 M, such as at least 200 M, such as at least 250 M, e.g. at least 300 M, such as at least 400 M, such as at least 500 M, e.g. at least 600 M, such as at least 700 M, such as at least 800 M, e.g. at least 900 M, such as at least 1000 M.

The length of the filter unit described elsewhere herein is at least 0.1 cM, such as at least 0.5 cM, e.g. at least 1 cM, such as at least 5 cM, such as at least 10 cM, e.g. at least 15 cM, such as at least 20 cM, such as at least 30 cM, e.g. at least 50 cM, such as at least 1 M, such as at least 2 M, e.g. at least 5 M, such as at least 10 M, such as at least 15 M, e.g. at least 20 M, such as at least 25 M, such as at least 30 M, e.g. at least 50 M, such as at least 75 M, such as at least 100 M, e.g. at least 150 M, such as at least 200 M, such as at least 250 M, e.g. at least 300 M, such as at least 400 M, such as at least 500 M, e.g. at least 600 M, such as at least 700 M, such as at least 800 M, e.g. at least 900 M, such as at least 1000 M, such as at least 1100 M, e.g. at least 1200 M, such as at least 1300 M, such as at least 1400 M, e.g. at least 1500 M, such as at least 1600 M, e.g. at least 1700 M, such as at least 1800 M, e.g. at least 1900 M, such as at least 2000 M, e.g. at least 2500 M, such as at least 3000 M, e.g. at least 3500 M, such as at least 4000 M, e.g. at least 4500 M, such as at least 5000 M. The preferred length is at least 2 M. More preferred is a length of at least 10 M. Most preferred is a length of at least 50 M.

The preferred dimensions of the filter unit is a height of at least 0.5 M, a width of at least 1 M and a length of at least 2 M. More preferred is a height of at least 1 M, a width of at least 5 M, and a length of at least 10 M. Most preferred is a height of at least 2 M, a width of at least 10 M, and a length of at least 50 M.

A roll of a filter unit may have at least two rounds, such as at least 3 rounds, for example at least 4 rounds, such as at least 5 rounds, for example at least 6 rounds, such as at least 7 rounds, for example 8 rounds, such as at least 9 rounds, for example at least 10 rounds, such as at least 12 rounds, for example at least 15 rounds, such as at least 20 rounds, for example at least 25 rounds of receiving/convective layer or receiving/convective/receiving layer or of the sandwich filters described elsewhere herein. The higher the number of rounds the higher the hydraulic capacity. A rolled filter unit is preferably isolated from its surroundings by covering it with a fluid-impermeable layer.

It is often preferable when determining the dimensions of the filter unit, to use a filter unit with many layers/rounds instead of using fewer layers/rounds with thicker layers, because the transfer distance must be taken into account. Thus often instead of doubling the layer thickness, it is preferable to use a stacked filter unit comprising a number of sandwich filters, in which the pollutants have to move a shorter distance to be trapped in the receiving layer.

Instead of a long filter unit the filter unit can be constructed of a number of sandwich filters, each sandwich filter being separated by a solute-impermeable material. Sandwich filters are described elsewhere herein. The solute-impermeable material between the sandwich filters is placed in the way that there is connection between two adjacent sandwich filters in the end of the filter. Sandwich filters no. 1 and 2 counted from the top are connected in the filter end opposite the main flow inlet, sandwich filters no. 2 and 3 are connected in the filter end close to the main inlet, sandwich filters no. 3 and 4, no. 5 and 6, no. 7 and 8, no. 9 and 10 etc are connected two and two in the filter end opposite the main flow inlet and sandwich filters no. 4 and 5, no. 6 and 7, no. 8 and 9, no. 10 and 11, no. 12 and 13 etc. are connected two and two in the filter end of the main flow inlet. Due to the construction of the filter the fluid to be filtered are running in a zigzag pathway and are driven by forces described elsewhere herein.

The filter unit just described with zigzag pathway of the fluid to be filtered comprises at least two sandwich filters, the number of sandwich filters can be as described elsewhere herein, and the sandwich filters can be constructed as described elsewhere herein. The filter with the zigzag flow can have a smaller total length and width than a filter with a straightforward flow, although the height is increased if the filtration capacity is equal. In the filter with the zigzag flow one or more of the upper sandwich filters can be renewed without a renewal of the lower sandwich filters.

A filter unit of the invention can have more than one flow inlet for the fluid to be treated. The additional flow inlets can be distributed within a distance from the main flow inlet, and inlets closer to the outlet of the filter unit can be used for fluid with a lower amount of substances to be depleted or enriched.

A filter unit of the invention can also have one or more flow outlets. Said flow outlets can be distributed within a certain distance from a flow inlet or the flow outlets can be connected to specific filter sandwiches of the filter unit, hereby drawing off fluids with a specific composition due to the properties of the sandwich filters which the fluids has been passed through.

Additional flow outlets (overflow outlets) can also be restricted to be used in cases unexpected large amounts of fluid has to pass the filter unit without or with poorer treatment, e.g. overflow of storm water.

Flow

A pressure head (hydraulic or gaseous) has to be established across the filter unit to make the fluid flow from the inlet to the outlet through the convective layer(s). By increasing the thickness of the convective layer a lower pressure head is needed for obtaining a given hydraulic capacity.

Hydraulic head in general, is the elevation of a water body above a particular datum level. Specifically, it is the energy possessed by a unit weight of water at any particular point. The hydraulic head consists of three parts: the elevation head, defined with reference to a standard level or datum; the pressure head, defined with reference to atmospheric pressure; and the velocity head. Fluid invariably flow from points of larger pressure head to points of lower pressure head, down the gradient.

A convenient way for establishing a hydraulic gradient is to use gravity but a pump may also be used to obtain an increased flow rate or an up-hill flow if desired. A hydraulic gradient of e.g. 1% corresponds to giving the filter a slope of 1 cm per meter along the direction of flow. In a vertical set-up of a filter unit the difference between water level in the inlet structure and water level in the outlet structure divided by the height of the filter unit equals the pressure head.

The hydraulic gradient can be obtained by a filter slope of at least 0.001%, such as at least 0.005%, e.g. at least 0.01%, such as at least 0.05%, e.g. at least 0.1%, such as at least 0.2%, e.g. at least 0.3%, such as at least 0.4%, e.g. at least 0.5%, such as at least 0.6%, e.g. at least 0.7%, such as at least 0.8%, e.g. at least 0.9%, such as at least 1.0%, e.g. at least 2%, such as at least 3%, e.g. at least 4%, such as at least 5%, e.g. at least 6%, such as at least 7%, e.g. at least 9%, such as at least 10%, such as at least 45%.

Dimensioning of the Filter Unit

The dimensions of the filter unit include the following: thickness of the receiving layers and convective layers, pressure head, length of the filter unit, width of the filter unit, number of layers (if stacked), number of rounds (if rolled).

To dimension the filter unit knowledge of the substance to be exchanged between a convective layer and a receiving layer is needed.

In case substance(s) are to be removed from a fluid the possible removal mechanisms must be considered. The removal process consists of 1) transfer to the receiving layer and 2) combating of the substance(s) in the receiving layer. The mixing-zone mass flow transfer mechanism is assumed to be a more important transfer mechanism than diffusion, and it also seem to compete with sedimentation for transfer of suspended particles. However, mixing-zone mass flow is not a well-described transfer mechanism. Thus, the dimensioning will have to be based on estimates, or preferably small-scale experiments. From the prior art much knowledge is available regarding the combating of substance(s) in the receiving layer, e.g. the sorption capacity of many filtering materials for heavy metals, many organic compounds, etc. is known from the literature. Otherwise, small-scale experiments including different filtering materials may be conducted in order to choose filtering material and/or formulation of filtering material (thickness, which is often approximately equal to thickness of receiving layer, grain size, surface coatings, renewal schemes, etc.).

In case substance(s) are to enter a fluid in the convective layer, similar considerations, and experiments must be performed.

Once a specific residence time has been calculated from either a substance removal claim, e.g. pollution reduction claim, or a substance enrichment claim, the dimensions of length and pressure head may to some extent be interchanged, i.e. decreasing the pressure head, and thus the flow rate in the convective layer, can compensate for a shorter length. If the pressure head is decreased the width and/or height of the filter unit must be increased if the same fluid capacity ($m^3/s$) is to be retained. It should be noted however, that mixing-zone mass flow seems to cause non-liniarity in such a length-flow rate compensation rule.

Use of the Filter Units

The filter units according to the present invention can be used for filtering almost any kind of fluid that can enter the convective layer and for which a suitable receiving layer can be designed. An illustrative and non-limiting list of liquids which can be filtered include: waste water, industrial waste water (pharma, oil, chemical, metal, food and feed industry), urban storm water runoff (urban runoff, highway and other road and parking lots runoff, roof runoff), combined sewer overflow, rain water, groundwater, surface waters (lakes, streams and rivers) for drinking water or remediation purposes, spillage water from car washing, laundries, etc., effluent from waste water treatment plants, water from sand blasting, oil.

In an embodiment the receiving layer may comprise microorganism which can convert substances, e.g. contaminants, of the fluid into other compounds, which either are less harmful or the substances are decomposed.

Additional embodiments of the filter unit may be used for filtering of wastewater, in which case the degradation conditions provide in the receiving layer must be optimised.

Additional embodiments of the filter unit may be used for cleaning of contaminated soil and other solids, e.g. manure, slurry from treatment plants, providing the solid can be transformed into a slurry thin enough to flow through the convective layer.

Additional embodiments of the filter unit may be used for enriching almost any liquid that can enter the convective layer with any substance that can be made to enter the liquid in the convective layer from the receiving layer.

The substance(s) that can be removed using the present invention include any substance for which a receiving layer can be designed. Both inorganic, organic and mixed inorganic-organic particles, colloidal particles, and solutes and other compounds, as well as micro-organisms and other organisms, dead or alive can be removed (filtered) from a fluid or made to enter a fluid with filter units according to the present invention providing an adequate receiving layer can be designed. Substances that can be removed include but are not limited to: hydrocarbons; oil (free phase and/or emulsions); heavy metals and other metals (e.g. copper, chromium, cadmium, nickel, iron, lead, zinc) as free ions, in complexes, as part of a larger molecule, or attached to suspended solids and/or colloidal particles; hormones; PAH; pesticides; BAM and other pesticide degradation products; pharmaceuticals; MTBE; phthalates; nutrients (e.g. ammonium, nitrite, nitrate, phosphate, sodium) in inorganic or organic, dissolved or solid forms; humus; soil colloids; clay; other organic and/or inorganic colloidal particles (corresponding to an approximate size fraction of 0.001 μm to 2 μm); silt and/or fine sand and/or other small particles (2-250 μm); medium and coarse sized sand and/or other larger sized particles (250-2,000 μm), chlorinated fluids; inorganic paint; organic paint; micro-organisms, e.g. bacteria, viruses, cysts, amoeba, worm eggs.

With suitable dimensioning the filter units may likewise be used for filtering gas. Examples include but are not limited to: flue gas, combustion engine exhausts, industrial exhausts, industrial waste gasses, ventilation air from production facilities, such as e.g. pig production.

In one embodiment preferred substances to be removed from a fluid are colloidal particles.

In another embodiment the preferred substances to be removed from a fluid are small particles.

In yet another embodiment the preferred substances to be removed from a fluid are large particles.

In a further embodiment the preferred substances to be removed from a fluid are one or more heavy metals.

In a further embodiment the preferred substance to be removed from a fluid is nitrate.

In another embodiment the preferred substance to be removed from a fluid is NaCl.

As can be understood from elsewhere the filter unit can be constructed to have any outer dimension of interest as well as the thickness of the convective layer(s) and receiving layer(s) can be any suitable. The flow rate or filtering rate of the fluid can be determined due, to the area of the cross section of the filter unit, the hydraulic conductivity of individual convective layers in the given embodiment, and the pressure head. The specific flow rate, q, (as described elsewhere), i.e. the progression speed of fluid in the convective layer, can be determined freely, but is preferably from 0.1 cM per hour to 1000 M per hour. Preferred is from 1 cM per hour to 100 M per hour. In an embodiment of the filter unit designed for removal of non-degradable contaminants, e.g. dissolved heavy metals and/or heavy metals associated with suspended solids from huge amounts of water, the preferred specific flow rate is from 1 M to 100 M per hour, such as . . . In an embodiment of the filter designed removal of wastewater with a load of nutrients and organic matter, e.g. household wastewater, or fish pond water, the preferred specific flow rate is slower, in order to allow for a degradation, for instance between 10 cM and 10 M per hour.

The disclosed filters can be used for a long period without being renewed. For instance, if the filter unit is to remove non-degradable or slowly degradable suspended solids from a fluid the storage capacity of the receiving layer can be made large enough to receive solids for a desired period of time, or alternatively the filter unit can be constructed in a way to render it self-cleaning. If the filter unit is made to retain dissolved solutes, e.g. heavy metals or organic pollutants, either a large amount of filtering material can be build into the receiving layer from the beginning, or a new amount can be applied to the receiving layer by means of the convective layer. In some cases renewed capacity may be gained simply by making a new coating of filtering material, e.g. a new iron-oxide coating, again by means of the convective layers. If the receiving layer is connected to an external system, i.e. has it's own inlet and outlet structures the capacity of the receiving layer can be renewed continuously.

In one embodiment the filters can be used for at least ½ year, such as at least 1 year, e.g. at least 2 years, such as at least 3 years, e.g. at least 4 years, such as at least 5 years, e.g. at least 6 years, such as at least 7 years, e.g. at least 8 years, such as at least 9 years.

In another embodiment the filters can be used for at least 10 years, such as at least 15 years, e.g. at least 20 years, such as at least 25 years, e.g. at least 30 years, such as at least 40 years, e.g. at least 50 years, such as at least 60 years, e.g. at least 70 years, such as at least 80 years, e.g. at least 90 years, such as at least 100 years.

EXAMPLES

Experimental Documentation

Experiments to illustrate the principle of dual porosity filtration have been carried out at two scales in the laboratory.

Laboratory Set-Up

Figure 2:
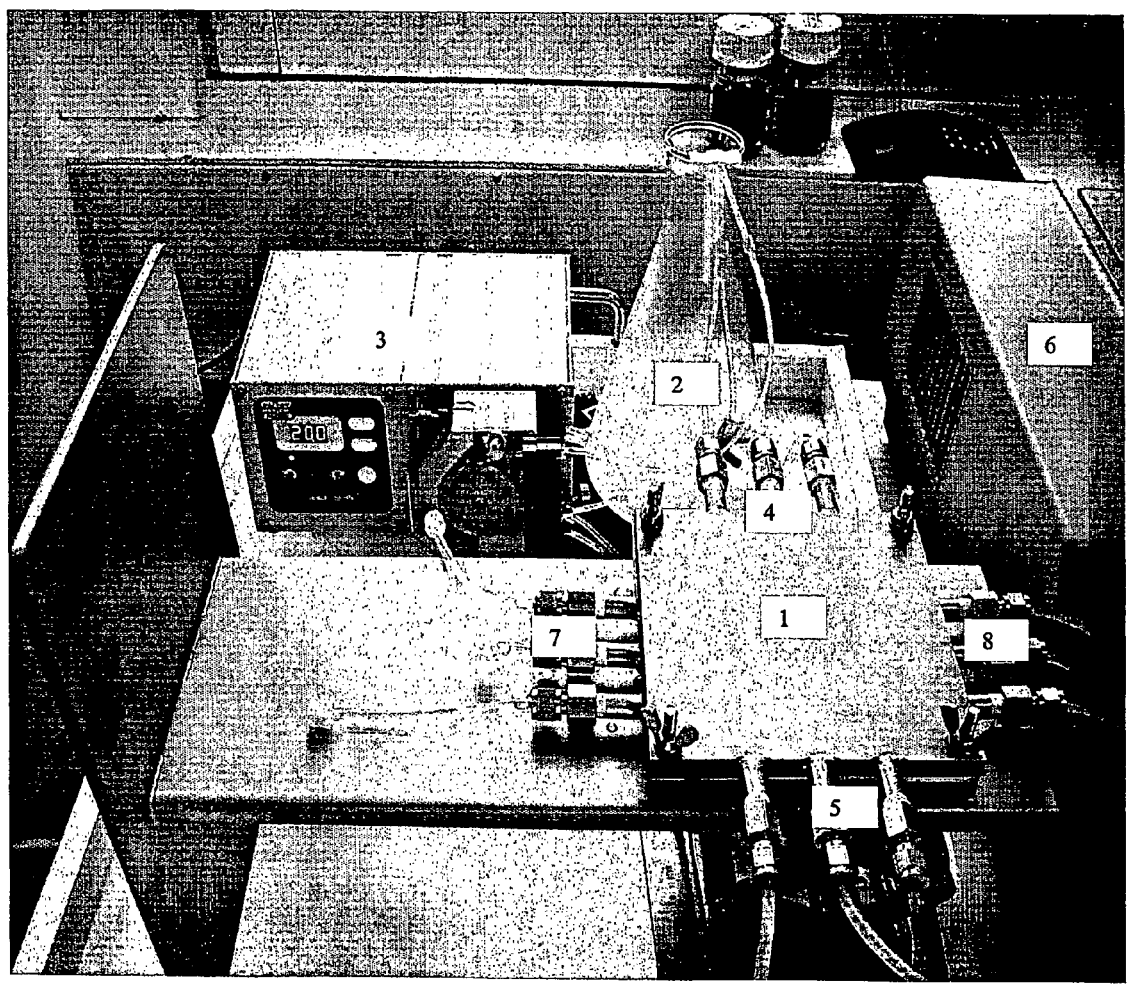
FIG. 2: Small filter-cell in a typical experimental set-up.
 1) filter-cell (10 cm by 10 cm, stainless steel); 2) influent container on magnetic stirrer; 3) peristaltic pump; 4) influent inlets; 5) effluent outlets; 6) in line spectrophotometer; 7) and 8) blinded in—and outlets (not in use).

At the smaller scale a single receiving layer and a single convective layer have been built into a 10 cm by 10 cm by 1.8 cm stainless steel cell, referred to as the "small filter-cell". In FIG. 2 the small filter-cell is shown in a typical experimental set-up.

Figure 3:
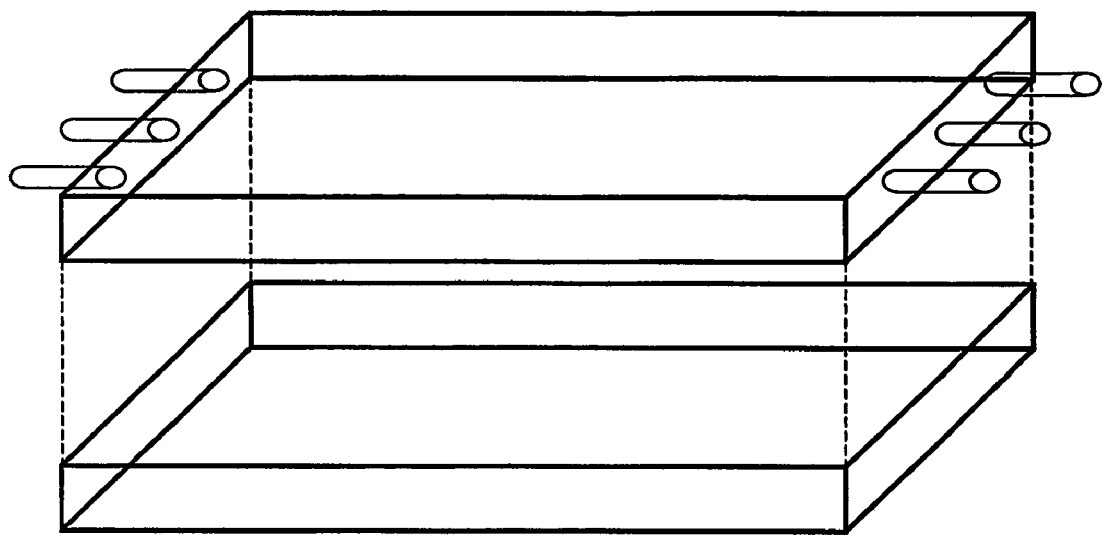
FIG. 3: Principle outline of small filter-cell.
 1) top chamber (supporting convective flow); 2) bottom chamber (containing receiving layer); 3) influent inlets; 4) effluent outlets. The top- and bottom chamber are joined with knots in the corners, illustrated by dotted lines.

The basic construction of the filter-cell is sketched in FIG. 3. It consists of a closed bottom chamber holding the receiving layer (empty, or packed with a filter medium), and a flow-through top chamber simulating the convective layer. Three inlets and three outlets in the top chamber make flow through the top chamber possible. As seen from FIG. 2 an influent solution containing the pollutant(s) of interest is placed in the influent container. With a peristaltic pump this solution is pumped to the three inlets in the top chamber of the filter-cell. Effluent is sampled from the three outlets, which are combined to a single tubing. This tubing can be connected to a spectrophotometer for in-line measurements of effluent light absorbance, or it can be used to sample effluent for further analyses, either manually or by connecting it to an automatic fraction collector.

Figure 4A:
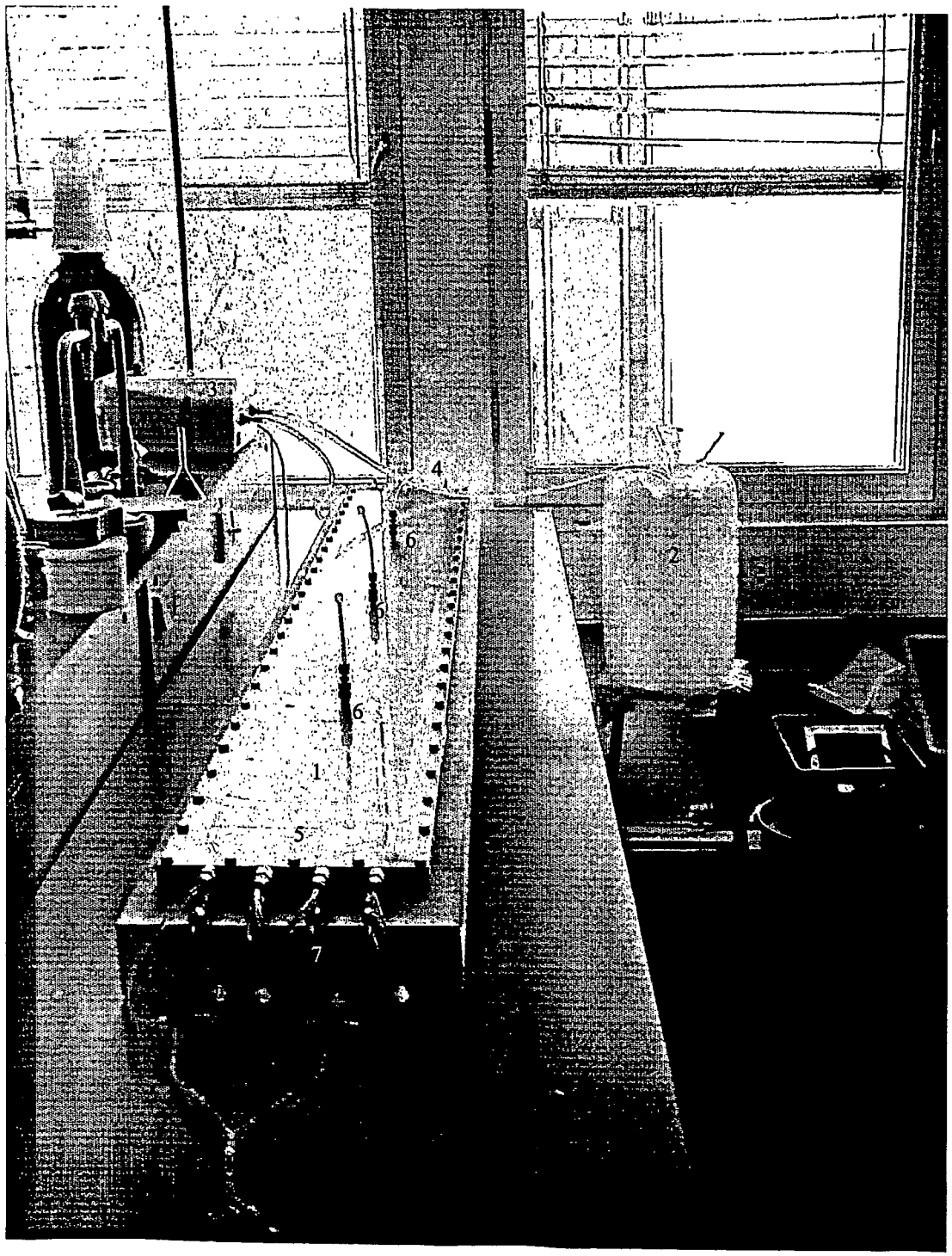
FIG. 4: Photos of large filter-cell.
 a) Filter-cell in operation. 1) filter-cell (20 cm by 200 cm stainless steel); 2) influent container; 3) pump; 4) influent inlets; 5) effluent outlets; 6) devices for sampling of solution in convective layer in distances of 50 cm, 100 cm and 150 cm from the inlets; 7) blinded not-in-use outlets in bottom chamber.
 b) Top chamber lifted off and bottom chamber being packed with lime grains.
 c) Sampling of solution in convective layer from vertical sampling device in 150 cm distance from inlet.
Figure 4B:
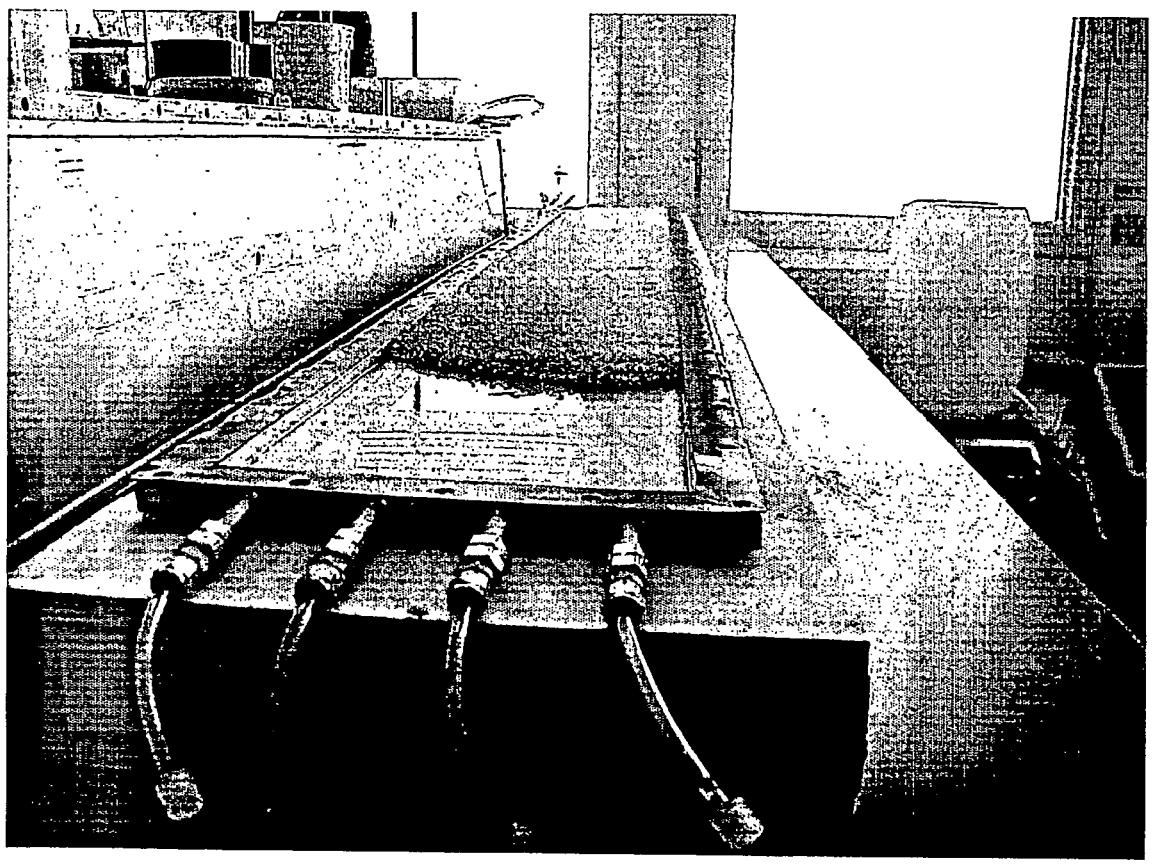
Figure 4C:
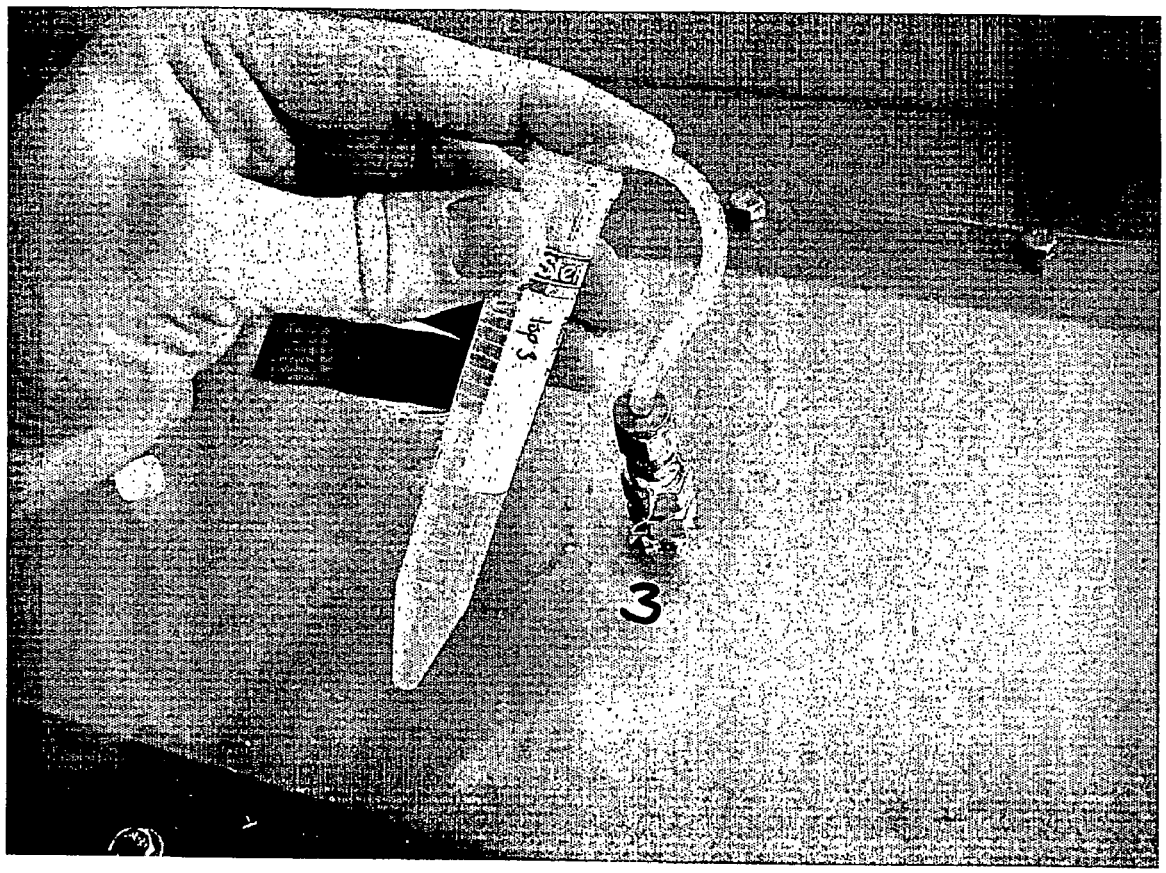

To test the dual porosity filtration concept at a larger scale, a 20 cm by 200 cm by 2 cm stainless steel cell have been constructed (FIG. 4). This cell, which is referred to as the "large filter-cell", has been constructed after the same principles as the small cell, with the additional feature of being able to sample fluid in the convective layer at different distances from the inlet. This feature is provided by three outlets inserted vertically in the ceiling of the top chamber along the axis of flow at the distances of 50 cm, 100 cm and 150 cm from the inlet.

Test Method Principles

By measuring the concentration of a given pollutant in the influent before entering the filter-cell ($C_0$) and again in the effluent leaving the filter-cell (C) the reduction in pollutant concentration that has occurred on passing the filter-cell can be measured.

If the filter-cell has been filled with pure water before shifting to pollutant influent, the first effluent will be free of pollutant (C=0), in that this effluent is antecedent filter-cell water. However, after a while the pollutant will appear in the effluent. When all antecedent water has been replaced by new influent the pollutant will appear in the effluent at a steady state concentration. If the steady state effluent concentration is lower than the effluent concentration (i.e. $C<C_0$) a loss of pollutant has taken place on passing the filter-cell. If the relative concentration ($C/C_0$) is equal to 1 no reduction has taken place. If $C/C_0$ equals zero all pollutant has been retained in the filter-cell. A $C/C_0$ coefficient of for instance 0.8 corresponds to a 20% reduction in pollutant concentrations on passing the filter-cell.

A solute (and/or a colloid) applied to the system can be transferred to the receiving layer by means of diffusion and mixing-zone mass flow. If the bottom chamber does not contain a filter medium the first effluent will have a lower concentration than the influent (that is $C<C_0$), even after all antecedent filter-cell water in the top chamber has been replaced by incoming influent. This initial loss is due to dilution of the flowing solution in the convective layer with stagnant water in the bottom chamber.

The solute is transferred to the receiving layer by 1) solute diffusing into the stagnant water, a process that will continue until the solute concentration in the stagnant water equals the influent concentration, and 2) mixing of flowing water in the top chamber with the upper part of the water body in the bottom chamber (by mixing-zone mass flow). If the bottom chamber is packed with a filtering material that is capable of retaining the solute (in which case the solute is a reactive solute) the initial loss will be followed by a steady loss, reflecting the ability of the filtering material to retain the solute at the specific conditions. The filtering material will—as long as retention capacity persists—continuously reduce the solute concentration in the stagnant water, in this way maintaining a concentration gradient from the convective layer towards the receiving layer. If the solute applied is non-reactive (=conservative) which means that it is not retained in any way by the filtering material, only the initial loss will reduce the effluent concentration of this solute. No continued loss can occur, unless special modifications of the filter is made. If for instance, an additional convective layer is placed below the receiving layer and connected to a separate flow system than the upper convective layer, the additional layer can carry the solute to another removal system. This has not been tested, but is a theoretical possibility.

A particle applied to the system can be transferred to the receiving layer by gravity (sedimentation transfer) and by mixing-zone mass flow. Mixing-zone mass flow is assumed to carry the particle to the interface of stagnant and semi-mobile fluid in the mixing-zone, and if—by chance—the particle reaches the truly stagnant water below it will continue downwards under the influence of gravity, and consequently at a speed that can be calculated from Stokes' law.

Bulk flow rate (Q, $m^3/s$) refers to the amount of water flowing through the filter-cell.

This is also called volumetric flow rate. Specific flow rate (q, m/s) refers to the volumetric flow rate per unit area, Q/A, where A is the cross sectional flow area. In case of the small filter-cell A=0.1 m×0.004 m=0.0004 $m^2$. In case of the large filter-cell A=0.2 m×0.004 m=0.0008 $m^2$.

A porevolume, PV, refers to the amount of mobile water in the system at a given time. For the small filter-cell, the theoretical value of PV≈40 ml (volume of top chamber), however the experiments conducted on the small filter-cell suggest the true PV to be somewhat smaller, 20-30 ml, assumable due to not all water in the top chamber, for instance water in the four corners of the cell, not being mobile. In the text below 1 PV refers to the theoretical volume. Regarding the large filter-cell 1 PV equals 1.6 L.

Experimental Series I:

Illustration of Diffusion and Mixing-zone Mass-flow Transfer Mechanisms

Experiment 1: Reactive and Non-reactive Solutes

According to the dual porosity filtration principle solutes can be transferred to the convective layer by mixing-zone mass flow and diffusion into the receiving layer. In the receiving layer the solute may be retained by surface reaction with a filtering material placed in the receiving layer. This has been illustrated by pumping a solution containing two solutes through the small filter-cell packed with activated carbon (AC) in the bottom chamber. The organic molecule Brilliant Blue FCF (BB) that can be retained by AC has been used as an example of a reactive solute, and the inorganic salt sodium-dithionite, which is not retained by AC, has been used as an example of a non-reactive solute.

Material in Bottom Chamber:

Activated Carbon (Carbochem®) LQ-1000 rinsed in demineralised water.

Influent:

The influent solution was based on the following to reagents:
1) Reactive solute: Brilliant Blue FCF (N-ethyl-N[4-[[4-[ethyl[(3-sulfophenyl)methyl]-amino]phenyl](2-sulfophenyl)methylene]-2,5-cyclohexadien-1-ylidene]-3-sulfobenzenemethanaimium hydroxide inner salt, disodium salt), which is a blue food dye with light absorption maximum at 630 nm. Depending on pH, BB is either neutral or dissociates to a mono- or bivalent anion (pKa=5.83 and 6.58). The experiments were conducted at neutral pH, so most of the BB had a negative charge of 2.
2) Non-reactive solute: Sodiumthiosulfate ($Na_2S_2O_8$), which is a small salt that do not react with activated carbon. The thiosulphate-ion ($S_2O_8^{2-}$) adsorbs light in the UV-range, and it is thus possible to measure thiosulphate simultaneously with BB.

It was prepared in distilled water and contained 0.5 ppm BB and 3.3 mM $Na_2S_2O_8$.

Effluent Measurements:

Effluent passed the flow-cuvette in the spectrophotometer. The spectrophotometer was reset to zero on effluent obtained during the air-removal process with demineralised water conducted prior to running the experiment. BB was measured at 630 nm. Thiosulphate was measured at 250 nm. By use of dilutions of the two influent solutions it was confirmed that the light absorbance of the two solutions at the given wavelengths correlated linearly with solute concentrations within the given concentration range ($R^2>0.99$). Flow rate was measured manually by collecting effluent in a measuring beaker for a certain time interval.

Running the Experiment:

Demineralised water was pumped through the filter-cell at a low flow rate to force air in the filter-cell to be replaced by water. Demineralised water was applied until the effluent appeared clear and no air bubbles were leaking out, corresponding to more than 10 PV (>0.4 L). The influent jar with demineralised water was then replaced with the BB-thiosulphate influent container, and time-dependent measurements of the effluent absorbance at the two wavelengths were recorded. After a steady state was reached in the effluent concentration, the flow rate was changed to a new flow rate. The flow rate was controlled by the peristaltic pump, and adjusted to three different rates, as shown in table 1.

TABLE 1

Applied flow rates in Brilliant Blue FCF and thiosulphate experiment

| | time (minutes) | | |
|---|---|---|---|
| | 0-33 | 34-72 | 75-86 |
| bulk flow rate, Q (ml/min) | 7.3 | 14.4 | 28.0 |
| specific flow rate, q (cm/min) | 1.8 | 3.6 | 7.0 |

Figure 5:
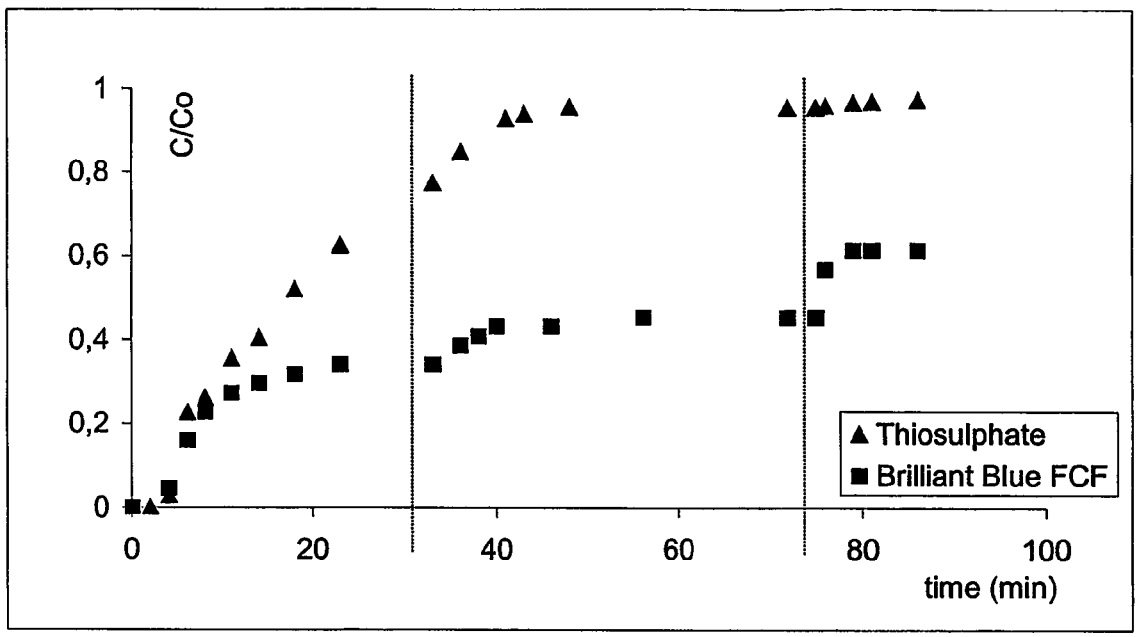
FIG. 5: Brilliant Blue FCF and thiosulphate retention in small filter-cell packed with activated carbon.
Relative concentrations ($C/C_0$) of Brilliant Blue FCF and thiosulphate in effluent as a function of time. Dotted vertical lines show times for change in flow rate.
Figure 6:
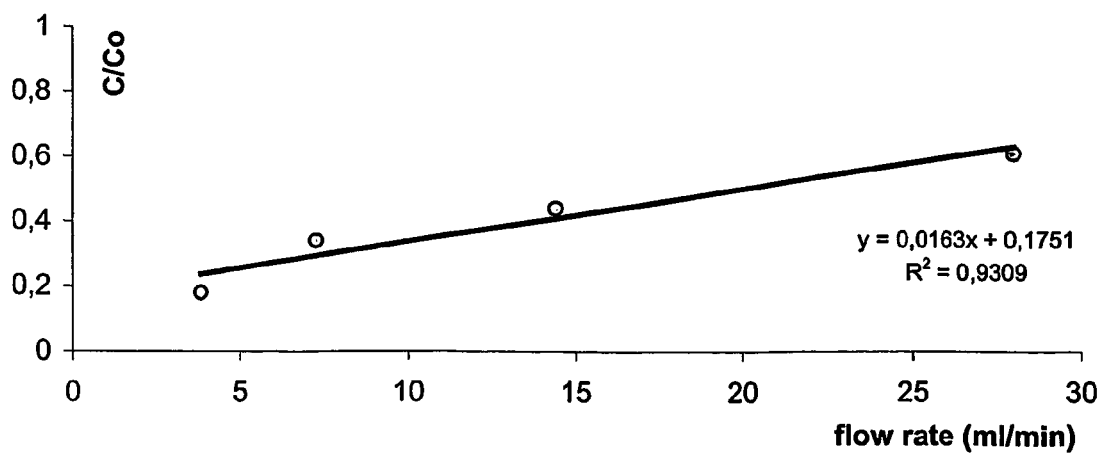
FIG. 6: Steady state effluent concentrations of Brilliant Blue FCF from FIG. 5 plotted against flow rate.

Results:

The results of the experiment is shown in FIG. 5 and FIG. 6. Both tracers are seen to break through in the effluent after 34 minutes of flow (FIG. 5). The $C/C_0$ of thiosulphate rises faster than the $C/C_0$ of BB, which levels off after 6-8 minutes and almost reaches steady state. At the intermediate flow rate $C/C_0$ of thiosulphate reaches almost 1 ($C/C_0$=0.96-0.97), i.e. the effluent concentration is almost equal to the influent concentration, and consequently there is only a diminishing gradient for driving the diffusion process. To the contrary the BB concentration in the effluent is less than half (40%) the BB concentration of the influent. When the flow rate is increased to the highest level no change in thiosulphate concentration, but a jump in the BB concentration, is seen. The jump reflects that a smaller fraction of BB is captured by the activated carbon at this higher flow rate (shorter residence time).

If the steady state concentrations for BB is plotted against the applied flow rates, a nearly linear relation is obtained; $R^2$=0.93 (FIG. 6). It shows that the removal rate is strongly dependent on the flow rate, or more precisely, the solute residence time, i.e. the longer it takes a packet of water to pass the filter-cell, the higher a fraction of its reactive solute content is removed.

Careful examination of FIG. 6 (and a series of similar experiments) reveals that steady state concentrations at high flow rates are lower than expected. This means that a higher fraction of BB is removed than expected from a strictly linear relationship between flow rate (or residence time) and removal rate. This deviation is ascribed to a positive effect of the mixing-zone mass flow removal mechanism with higher flow rate (FIG. 1a). At increased flow rate the thickness of the mixing zone is assumed to increase, i.e. the turbulent reaches deeper into the receiving layer, giving rise to a better contact between pollutants and sorptive surfaces, in this way counteracting for the shorter residence time.

Based on the experimental results alone it is not possible to distinguish between the mixing-zone mass flow removal mechanism and the diffusion removal mechanism. It is however possible to estimate the relative impact of the two processes on the overall removal rate by use of a mathematical model. Such preliminary estimations indicate that the mixing-zone mass flow driven removal mechanism is more important that the diffusion driven removal mechanism.

Experiment 2: Heavy Metals Removal

Heavy metals in dissolved form are examples of reactive solutes that are typical pollutants in many types of wastewater. The ability of the invention to remove zinc ($Zn^{2+}$), copper ($Cu^{2+}$) and lead ($Pb^{2+}$) has been demonstrated by use of the 10 by 10 cm filter-cell. Further, in the large filter-cell the removal of heavy metals has been demonstrated at higher flow rates, both under continuous flow (zinc, copper, lead and iron ($Fe^{3+}$) and with recycling of the flow (zinc, copper and iron). By recycling of the flow, i.e. return of the effluent to the influent jar, a longer filter length can be simulated.

Material in Bottom Chamber:

Grinded limestone, grain size 0-4 mm, trademarks Nevtraco. This is a lime product that is used for oxygenation of groundwater at waterworks. The product was rinsed in tap water before use, whereby the finest particles were removed. The bulk porosity of the product is approximately 60%.

Influent:

Heavy metals influent solutions were prepared by dissolving the following analytical grade chemicals $CuSO_4$ $5H_2O$, $ZnCl_2$ and $PbBr_2$ in demineralised water to obtain the influent compositions shown in table 2.

TABLE 2

Concentrations of zinc, copper and lead used in the experiments

| | Influent (µg/L) | | |
|---|---|---|---|
| | $Zn^{2+}$ | $Cu^{2+}$ | $Pb^{2+}$ |
| small filter-cell | 400 | 200 | 27 |
| large filter-cell | 400 | 200 | 200 |

Samples from the experiment run on the small filter-cell were analysed by use of an ICP (Perkin Elmer, Optima 3000 XL). Samples from the experiments run on large filter-cell were analysed by use of Dr. Lange Cuvette Tests (zinc: LCK 360; copper: LCK 529; lead: LCK 306) and a spectrophotometer (Dr. Lange CADAS 30 PHOTOMETER).

Running the Experiment, Small Filter-cell:

Flushing with demineralised water in the same way as described previously initialized the filter-cell. The heavy metal influent was applied to the filter-cell at four different flow rates, as shown in Table 3. After 200 ml of flow at each flow rate effluent was sampled and analyzed.

TABLE 3

Flow rates applied in heavy metals experiment on small filter-cell

| | Flow rate | | | |
|---|---|---|---|---|
| | 1 | 2 | 3 | 4 |
| Bulk flow, Q(ml/min) | 4.6 | 13.5 | 18.3 | 22.9 |
| Water flux, q (cm/min) | 1.1 | 3.4 | 4.6 | 5.7 |

Running the Experiment, Large Filter-cell, Continuous Flow:

The filter-cell was initialized in the same way as described for the small, i.e. approximately 10 PV of water was pumped through the filter-cell before shifting to heavy metals containing influent. The heavy metal influent was applied at a specific flow rate of 60 cm/min. After 5 L of flow, corresponding to approximately 3 PV, effluent was sampled and analyzed.

Running the Experiment, Large Filter-cell, Recycled Flow:

After completing the continuous flow experiment, the effluent tubing was inserted into the influent container, to allow for recycling. The entire recycling volume was approximately 6.6 L (5 L in influent container+1.6 L in top chamber). At a water flux of 60 cm/s a filter of 100 m length will give a residence time of 167 min. As only a fraction of 0.24 (1.6 L/6.6 L) of the entire recycling volume is running through the filter-cell at a time, the recycling time should be correspondingly increased, i.e. to 167 min/0.24=11 h 30 min, in order to have the large filter-cell simulating a 100 m long filter.

It should be noted that the 100 m simulation procedure gives a rough estimate of a real 100 m long filter only, in that the magnetic stirring in the influent container corresponds to a complete mixing of fluid in the convective layer for every 2 m, which is not the case.

Results

Figure 7:
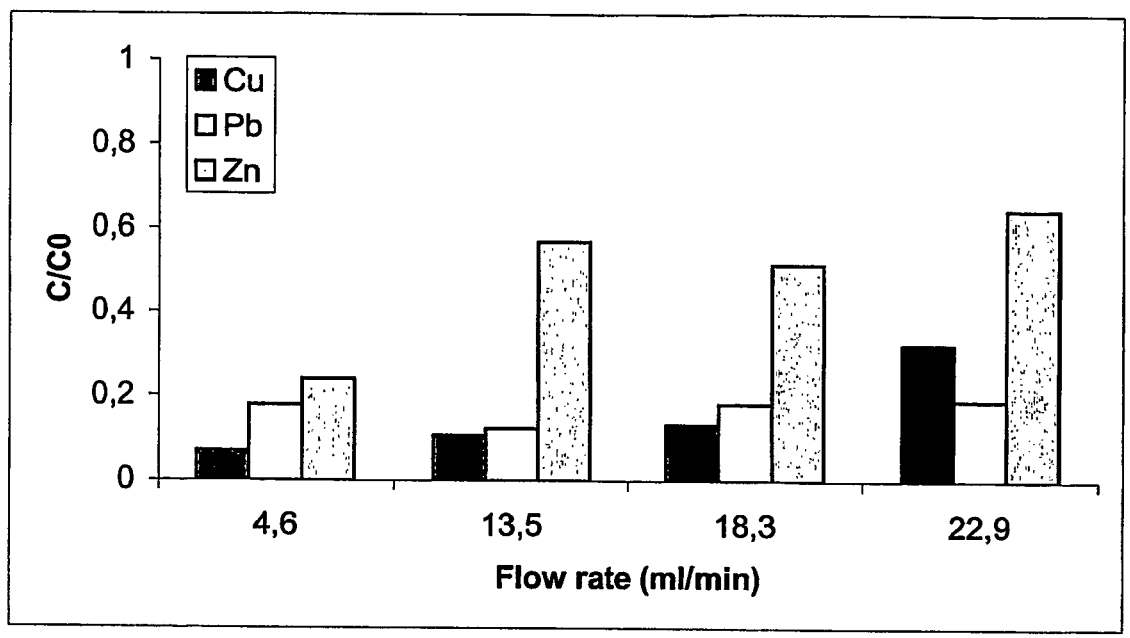
FIG. 7: Heavy metals retention in small filter-cell packed with lime grains.
Relative concentrations of $Cu^{2+}$, $Pb^{2+}$ and $Zn^{2+}$ in effluent at four different flow rates.

Results from the small filter-cell are shown in FIG. 7. Results from the large filter-cell are shown in FIG. 8.

From FIG. 7 it can be seen that the concentrations of all three heavy metals are strongly reduced on passing the small filter-cell at the experimental flow rates. At the lowest flow rate copper is reduced by more than 90%, lead by more than 80% and zinc by more than 70%. With increasing flow rate there is a tendency for copper and especially zinc to be reduced less, which is in accordance with the shorter residence time at increased flow rate. The pattern for lead deviates; approximately the same fraction of lead seems to be removed at all flow rates. However, due to the very low influent concentrations used for lead the effluent concentrations were below the detection limit for the ICP (9 μg Pb/L), and the data are consequently only indicative of a strong lead removal.

Figure 8:
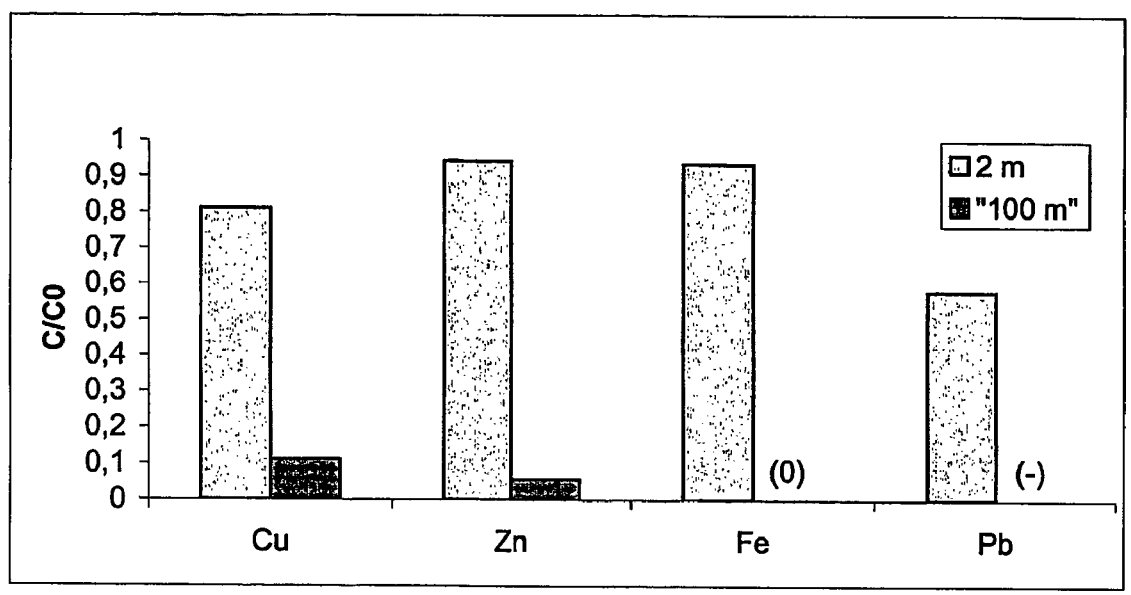
FIG. 8 Heavy metals retention in large filter-cell packed with lime grains under continuous and recycled flow.
Relative concentrations of $Cu^{2+}$, $Pb^{2+}$, $Zn^{2+}$, and $Fe^{3+}$ in effluent obtained under continuous and recycled flow. Recycling period corresponds to a filter length of "100 m". The lead measurement at "100 m" was missed.

FIG. 8 demonstrates that it is possible to remove heavy metals by use of dual porosity filtration at high flow rates too. A single passing of the large filter-cell results in reduced concentrations of all four metals, all though the reductions are far below the reduction rates observed in the small filter-cell. The theoretical residence time in the large filter-cell is 3.3 min (200 cm/60 cm/min) while the theoretical residence time in the small filter-cell at the lowest flow rate is 9.1 min (10 cm/1.1 cm/min) and at the highest flow rate 1.8 min (10 cm/5.7 cm/min). At all flow rates the heavy metal removal rates are much better in the small filter-cell, and it may thus be concluded that differences in theoretical residence time do not explain the differences in effluent concentrations. Although this may in part be ascribed to theoretical residence times being a poor measure of real residence times, it does indicate that at higher specific flow rates the conditions for reactions between the sorbent and the solutes are poorer.

Simulating a 100 m long filter, by recycling of the flow, shows that very low concentrations of zinc, copper and lead can be obtained by use of dual porosity filtration with lime as a sorbent.

Conclusion:

The heavy metal removal experiments illustrate that dual porosity filtration effectively removes reactive solutes like dissolved ions of the heavy metals zinc, copper and lead when the receiving layer contains an appropriate filtering material, for instance lime. Filter length (or residence time) and specific water flow rate in combination appear to be essential filter dimensioning parameters.

Experimental Series II:

Illustration of Sedimentation and Mixing-zone Mass-flow Transfer Mechanisms

According to the dual porosity filtration principle particles can be transferred to the convective layer by mixing-zone mass flow and sedimentation into the receiving layer. In the receiving layer the particle may be retained by sedimentation on the bottom structure of the receiving layer (e.g. a membrane fine enough the retain the particles in question) and/or by sedimentation in pores and cavities between and/or in a filtering material placed in the receiving layer. Colloidal particles, which are small particles with colloidal behaviour, for instance clay particles, bear characteristics of both solutes and particles. Colloidal particles are larger than the size of molecules but small enough to stay suspended for a longer period of time.

Thus they will due to Brownian movements, move from high to low concentrations in a diffusion like manner, and they may, if time and conditions are adequate, settle under the influence of gravity. The performance of dual porosity filtration in terms of particle removal has been tested with clay-sized particles, knowing that larger particles will be retained more easily. A series of experiments to illustrate suspended solids removal with dual porosity filtration have been conducted on the small as well as the large filter cell using both natural clays and a standardized clay product.

Experiment 3: Removal of Kaolin in Small Filter-cell with Empty Bottom Chamber.

Material in Bottom Chamber:

The bottom chamber was empty. When starting the experiment the bottom chamber would immediately become filled with water.

Influent:

Kaolin suspension. Powdered kaolin (Bole white powder, extra pure low bacterial content) from Merck was suspended in demineralised water to a concentration of approximately 140 mg/L as determined by drying of 100 ml of the suspension to complete dryness at 105° C. and weighing the residual. The influent container was kept on a magnetic stirrer to prevent the kaolin from settling. It was possible to maintain the suspension fairly homogeneous.

Runnning the Experiment:

The filter-cell was flushed with water for a little while, before shifting to the kaolin-suspension influent. After 45 minutes of flow at a specific flow rate of q=1.9 cm/min the experiment was stopped and the top chamber removed.

Figure 9:
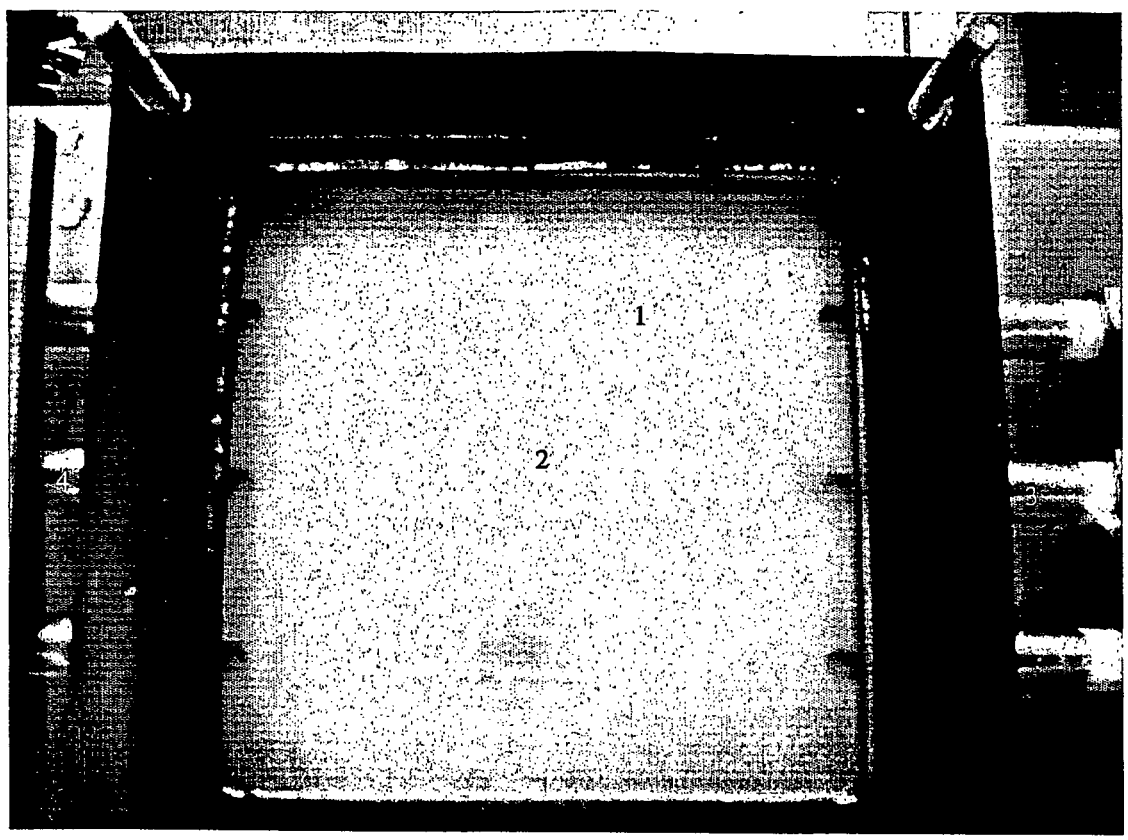
FIG. 9: Kaolin retention in small filter-cell with empty bottom chamber.
Top chamber removed after applying a kaolin suspension for a period of time. 1) A thin greyish layer of kaolin is seen to have settled on the bottom of the bottom chamber, 2) with a finger a cross has been drawn in the sediment, exposing the stainless steel bottom plate of the chamber. 3) and 4) blinded not-in-use in- and outlets.

Result:

The photo on FIG. 9 illustrates the result of the experiment. A thin layer of kaolin has settled on the bottom of the bottom chamber.

Conclusion:

This simple experiment demonstrates that the presence of a stagnant water layer is sufficient to capture a fraction of the particles carried across it in a convective flow.

Experiment 4: Removal of Kaolin and Natural Clays in Small Filter-Cell Packed with Lime Grains Material in Bottom Chamber:

The bottom chamber was packed with lime grains (Nevtraco) rinsed in tap water.

Influent Suspensions:

1) A kaolin suspension was prepared as described in experiment no. 3 and Table 4.
2) Natural clay suspensions were prepared from four Danish till samples, kindly provided by the geological survey company GEO, Maglebjergvej 1, DK-2800 Lyngby, Denmark. The four samples represented different types of Danish tills, as shown in Table 4. Approximately 100 g of each till sample was suspended in demineralised water and allowed to settle for a time period long enough to leave only clay-sized particles in suspension (supernatant). This time period was calculated from Stokes law adapted to clay-shaped particles. The supernatant was collected and used as stock suspensions for preparing the influent suspensions. After determination of the content of suspended solids by drying and weighing of 100 ml, the influent suspensions were prepared by dilution to the concentrations shown in Table 4. Particle size distributions of the natural clay stock suspensions and the kaolin suspension were determined with a Mastersizer 2000 Ver. 4.00 by Particle Analytical ApS, Agern Alle 3, DK-2970Hørsholm, Denmark. The results are shown in Table 4 and in FIG. 10.

TABLE 4

Suspended solids tested

| | Geological characterisation provided by GEO | Influent conc. (mg/L) | Size distribution Percentile (diameter, μm) | | |
|---|---|---|---|---|---|
| | | | d(0.1) | d(0.5) | d(0.9) |
| Kaolin | (Bole white powder form Merck) | 281 | 2.76 | 7.33 | 23.05 |
| R1 0-0.2 m | Clayey sand soil. Dark greyish brown. With organic matter. | 130 | 1.32 | 5.46 | 11.45 |
| R2 0.2-0.5 m | Sandy, gravelly clayey till. Yellowish brown. No lime. | 239 | 1.46 | 2.84 | 6.88 |

TABLE 4-continued

Suspended solids tested

| | Geological characterisation | Influent conc. | Size distribution Percentile (diameter, μm) | | |
|---|---|---|---|---|---|
| | provided by GEO | (mg/L) | d(0.1) | d(0.5) | d(0.9) |
| T1 0.2-0.5 m | Sandy clay soil. Dark greyish brown. With organic matter. | 161 | 1.89 | 3.52 | 6.09 |
| T2 3.0 m | Gravelly sandy till. Grey. With lime. | 103 | 0.95 | 2.899 | 6.93 |

Effluent Measurements:

The effluent tubing was connected directly to a flow-cuvette in a spectrophotometer (Milton Roy, Spectronic 1201) and light absorbance at 530 nm was measured and compared with absorbance at the same wavelength of the influent solution. The spectrophotometer was reset to zero on demineralised water. It was controlled that a linear relationship between dilutions of the influent suspension and the light absorbance at 530 nm existed ($R^2 > 0.99$). Flow rate was measured manually by collecting effluent in a measuring beaker for a certain time interval.

Running the Experiment:

The filter-cell was flushed with tap water prior to applying the influent solution. When a steady state had been reached in the effluent concentration, the flow rate was changed. The flow rate was controlled by a peristaltic pump, and adjusted to five different rates, as shown in Table 5. Each flow rate was applied for a time period long enough to obtain stable (steady state) effluent measurements, i.e. longer periods at lower flow rates.

TABLE 5

Flow rates applied for kaolin and natural clay suspension in experiment 4.

| | Time period | | | | |
|---|---|---|---|---|---|
| | I | II | III | IV | V |
| Bulk flow rate, Q (ml/min) | 8.1 | 16.7 | 6.1 | 12.8 | 21.8 |
| Specific flow rate, q (cm/min) | 2.0 | 4.2 | 1.5 | 3.2 | 5.5 |

Figure 10:
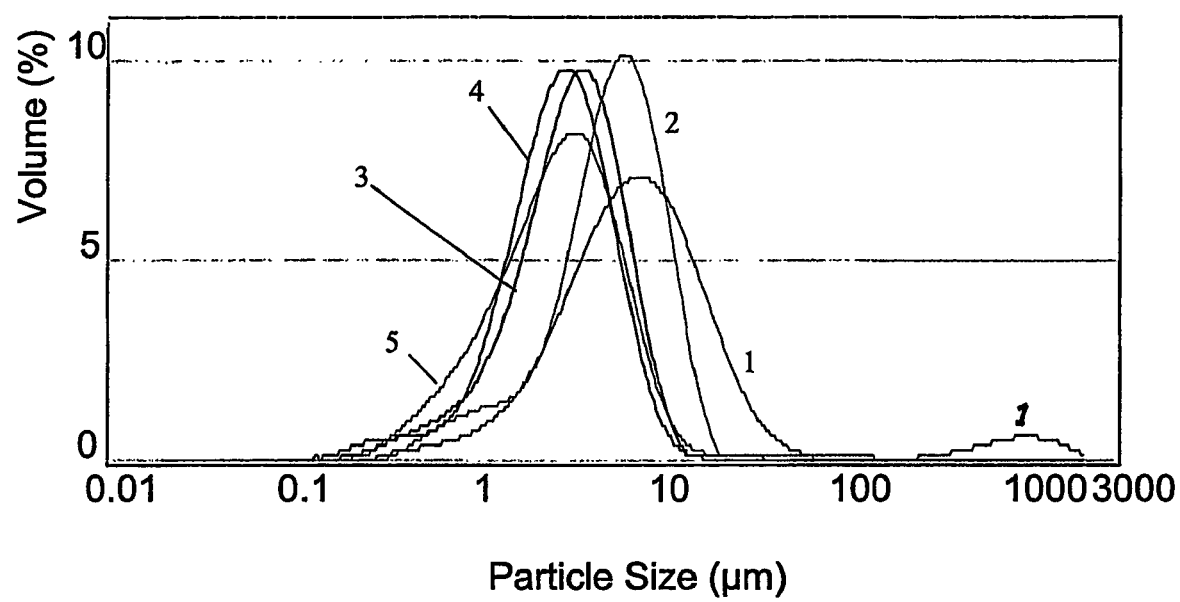
FIG. 10: Particle size distribution as analyzed by Particle Analytical ApS.
 1) kaolin, 2) "R1", 3) "T1", 4) "R2" and 5) "T2".
Figure 11:
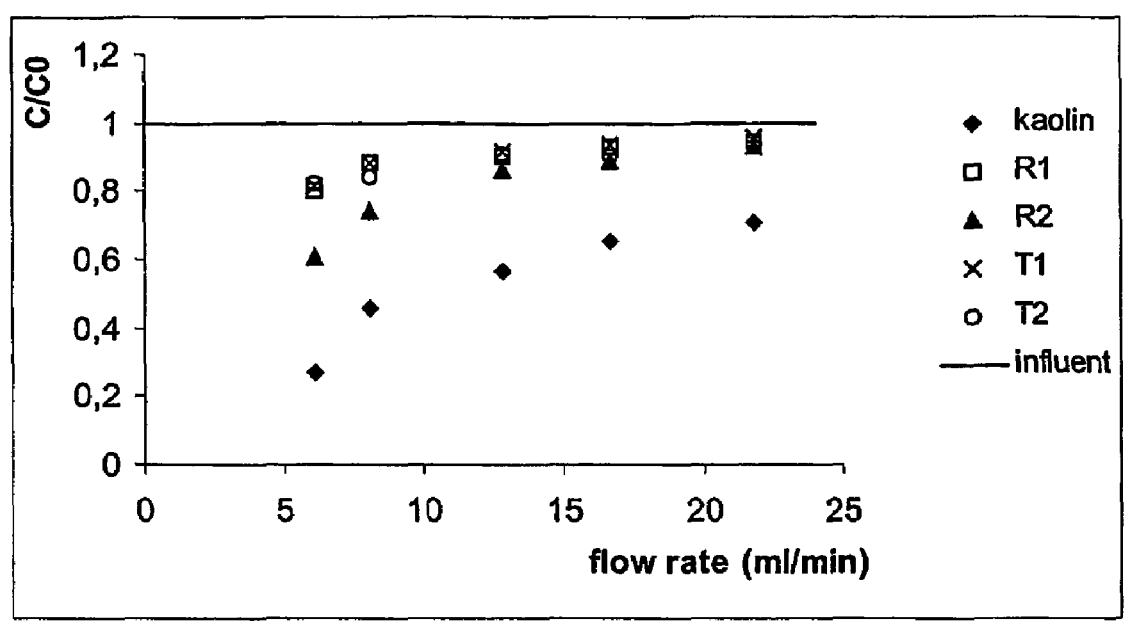
FIG. 11: Steady state effluent concentrations of kaolin and natural clays in small filter-cell packed with lime grains plotted against flow rate.

Results:

The results are shown in FIG. 11, where the steady state effluent concentrations (i.e. the effluent concentrations obtained at the end of each time period) are plotted against the different flow rates. It is seen that the removal rate is much stronger in case of kaolin than for the natural clays. Among the four natural clays the R1 sample has a higher removal rate compared to the other three. From Table 4 and FIG. 10 it can be seen that the removal rates correlate with the size distribution of the suspensions. Kaolin has the highest content of large particles as indicated by d(90) and its right-most position of the curves in the size distributions shown in FIG. 10, R1 comes in on position number two, while the three remaining clay suspensions (R2, T1 and T2) are hardly distinguishable.

Further, it is evident that the removal rates express a negative correlation with flow rate. However, the relationship is not linear, rather the removal rate approaches the influent concentration asymptotically at high flow rates. This means that a higher fraction of suspended solids are removed than what would be expected from a simple extrapolation of the removal rates observed at lower flow rates. This points to the mixing-zone mass flow being positively involved in particle removal, in that this is the only process that due to a greater thickness of the mixing-zone can provide better filtrations conditions at high flow rates. Neither diffusion, nor sedimentation should be favored by high flow rates.

Conclusion:

The removal rate of suspended solids depends on the flow rate (or residence time) and the size of the particles, other things being equal. The relationship is not linearly correlated with flow rate.

Experiment 5: Removal of Kaolin and Natural Clay in Large Filter-cell Packed with Lime Grains Material in bottom chamber Same as in experiment no. 4.

Influent:

1) Kaolin suspension prepared as in experiment no. 4
2) Natural clay suspension based on the T1, i.e. one of the three fine sized clay fractions (Table 4 and FIG. 10).

Effluent Measurements:

Effluent was sampled from the outlet tubing and from the vertical sample devices in the top chamber. After completing the experiment the samples were shaken to resuspend the solids, and measured at wavelength 530 nm in the spectrophotometer.

Running the Experiment:

After initializing the filter-cell by applying tap water for approximately 10 L, the influent was shifted to the kaolin suspension. A volume of approximately 5 L was applied at four different flow rates as shown in Table 6. Towards the end of each flow rate period effluent was sampled as described above. Then the influent was shifted to the T1 clay suspension and the experiment repeated for three different flow rates as shown in Table 6.

TABLE 6

Specific flow rates (q, cm/min) applied in experiment 5 with removal of kaolin and a natural clay (T1)

| | Period | | | |
|---|---|---|---|---|
| | I | II | III | IV |
| kaolin | 28.8 | 47.4 | 71.8 | 91.0 |
| T1 | 46.6 | 56.4 | 75.0 | — |

Results:

The results are shown in FIG. 12. In FIGS. 12a and 12b the concentrations of suspended solids of kaolin and T1 suspensions, respectively, have been followed over the length of the 200 cm filter-cell at different flow rates. First of all it can be seen that removal of fine suspended solids (FIG. 10) is possible with dual porosity filtration also at higher flow rates. As expected the removal rate is higher (steeper slope) for the larger sized kaolin particles than for the T1 suspension at comparable flow rates.

It can be seen that the removal rate is constant along the axis of flow; that is the concentrations in the samples collected from the vertical samplers (50, 100 and 150 cm distances from the inlet) fit onto a straight line. It should be noted that a higher relative concentration is measured at the 200 cm outlet. No explanation for this deviation from the straight line has been found, but it is assumed to be an experimental bias.

Figure 12A:
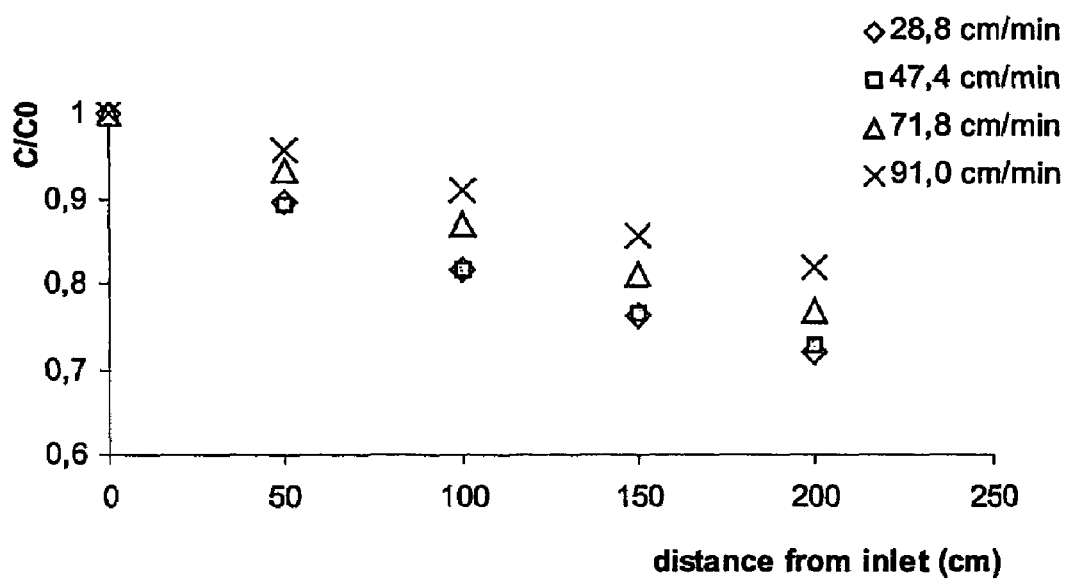
FIG. 12: Kaolin and natural clay (T1) retention in large filter-cell.
 a) Relative concentration of kaolin in the convective layer at different distances from the inlet and at different flow rates.
 b) Relative concentrations of T1 natural clay suspension in convective layer at different distances from the inlet and at different flow rates.
 c) Simple extrapolation of kaolin removal trend line to intersection with abscissa.
Figure 12B:
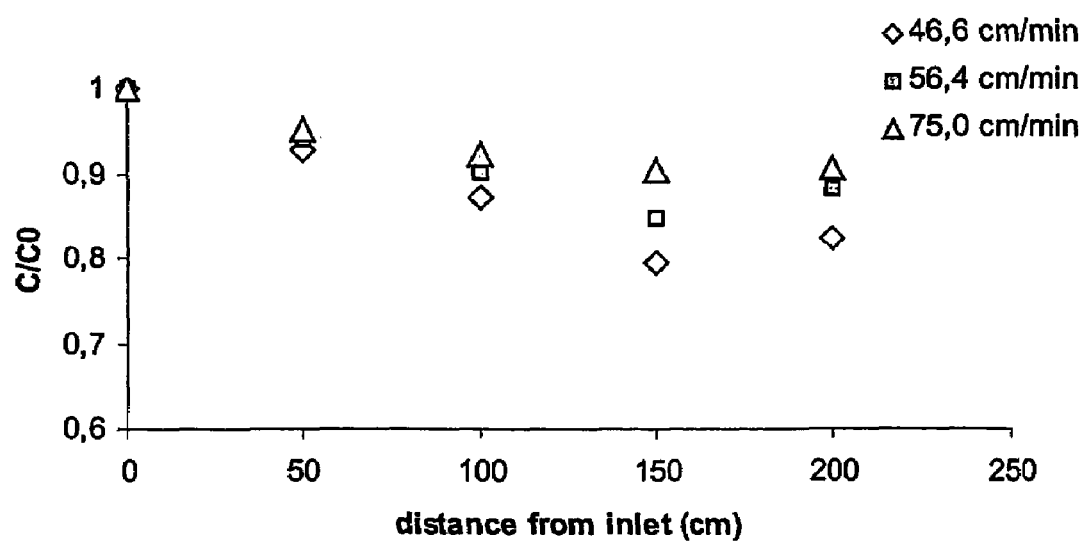
Figure 12C:
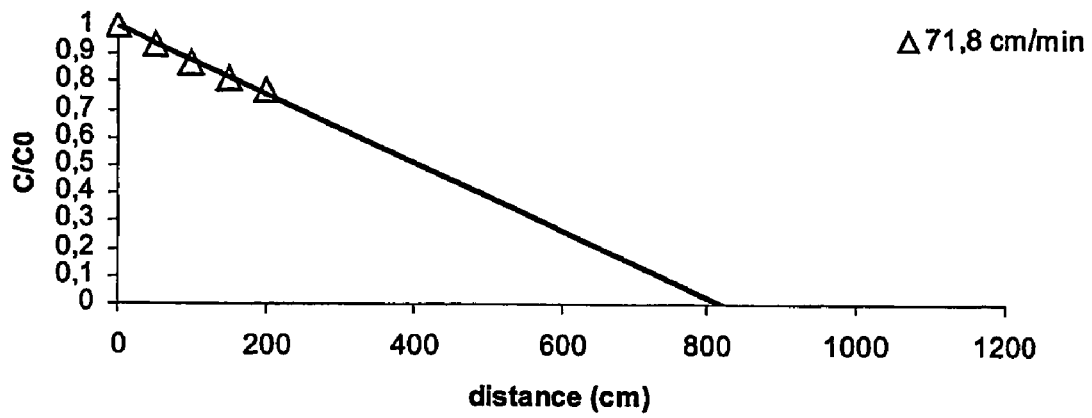
Figure 12D:
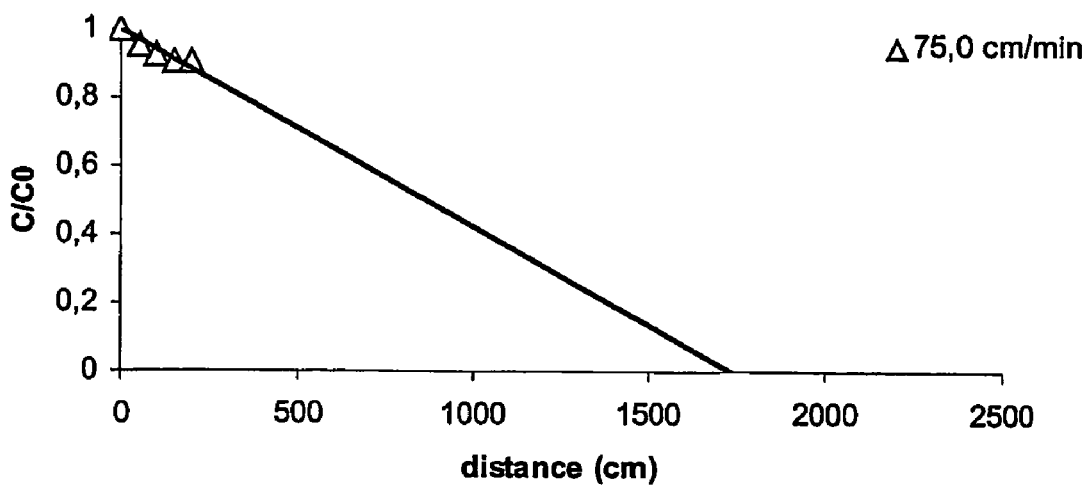

A simple extrapolation of the trend line obtained at a given flow rate can give a rough estimation of the filter length that will be necessary if an outlet concentration of zero is wanted. As shown in FIG. 12c and FIG. 12d this corresponds to approximately 8 m in case of kaolin and 18 m in case of T1 clay. If only the inlet and outlet concentrations are used for the extrapolations (that is, the samples at 50 cm, 100 cm and 150 cm from the inlet are being left out) the necessary filter length for complete kaolin removal is less than 9 m and for complete T1 clay removal it is less than 22 m. It should be noted that such estimations are very rough, and should only be taken as an indication. The main problem with the extrapolation is that the particles in the suspensions are of different size as shown in FIG. 10, and consequently it must be expected that the heavier particles will be removed from the convective layer faster than the finer particles.

Experiment 6: Simulating a Longer Filter by Recycling of a Natural Clay (T1) Suspension through the Small Filter-cell and the Large Filter-cell Material in Bottom Chamber (Both Filter-cells):
Nevtraco lime.

Influent (Both Filter-cells):
T1 clay suspension with a concentration of approximately 161 mg/L.

Running the Experiment, Small Filter-cell:
Following experiment no. 4, one L of T1 clay suspension was recycled through the small filter-cell by connecting the effluent tubing from the spectrophotometer flow-cuvette to the influent container. The flow rate was 8.1 ml/min corresponding to q 2.0 cm/min. The spectrophotometer measured the light absorbance at 530 nm every 15 minutes for 17 hours. The total mobile volume was approximately 1030 ml (volume in influent container+volume in top chamber). Thus, after 127 min the entire influent volume will have passed the filter-cell once. In 17 hours it will be approximately 8 times, corresponding to a "filter-length" of approximately 0.8 m.

Running the Experiment, Large Filter-cell:
Following experiment no. 5, five L of T1 clay suspension was recycled through the large filter-cell simply by connecting the effluent tubing to the influent container. The flow rate was 480 ml/min corresponding to q=60 cm/min. A substream of the effluent was continuously passed through the spectrophotometer, which measured the light absorbance at 530 nm at 15 min. time intervals. The effluent from the spectrophotometer flow-cuvette was also recycled to the influent container. The experiment was continued for 24 hours and 15 minutes. The total mobile volume was approximately 6.6 L. At the given flow rate the entire influent volume will have passed the filter-cell once after 13.8 min. During 24.25 hours this corresponds to a filter contact time of 5.56 hours, or a "filter-length" of 200 m at the given flow rate.

It should be noted that the simulation is rough, mainly due to the mixing performed in the influent container, but not taking place in a real filter.

Figure 13A:
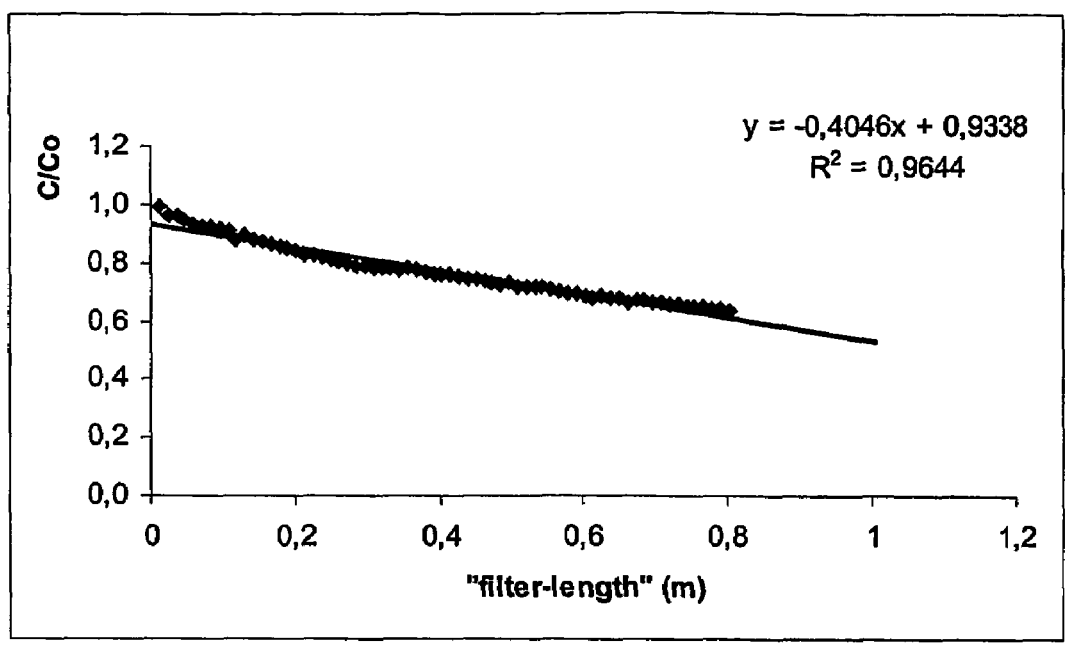
Figure 13B:
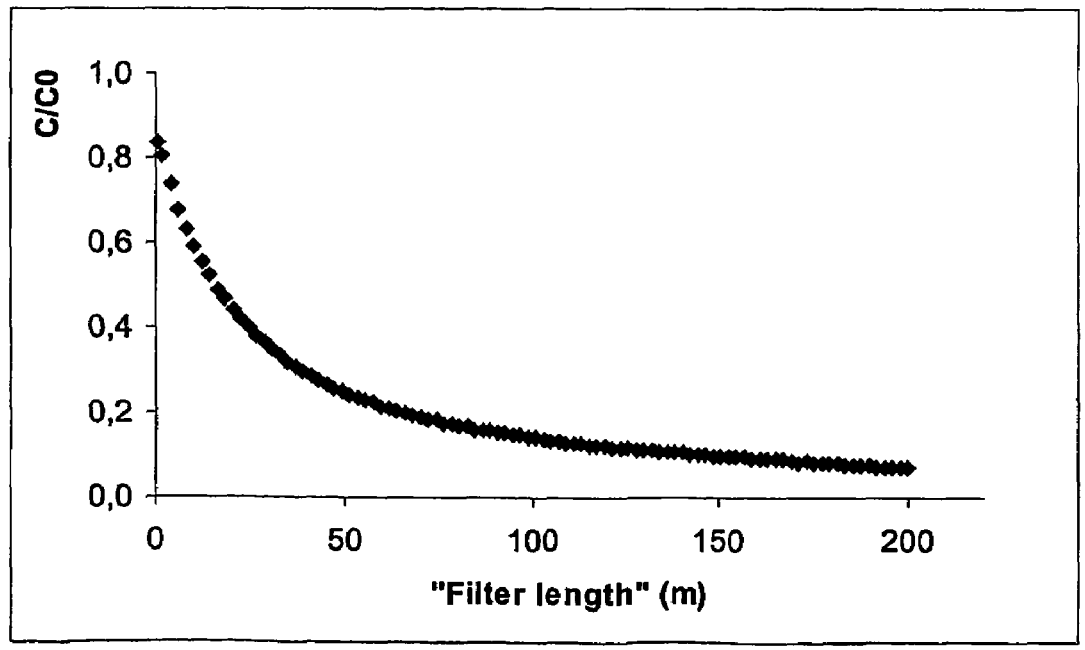

Results:
The results are shown in FIG. 13a and FIG. 13b.
From FIG. 13a it can be seen that the removal rate declines slightly as the experiment proceeds, indicating that the largest particles are removed faster than the smaller particles. The total removal after 17 hours of recycling at the given flow rate corresponding to 0.8 m of filter length amounts to 37%.

From FIG. 13b it is seen that the removal rate declines exponentially with filter length, which is in accordance with the theory of larger particles being removed faster than smaller particles. After 24 hours of flow, or "200 m filter length", only 7% of the original content of suspended solids in the recycling volume are still present in the suspension. If these remaining 7% correspond to the 7% finest particles, this—according to the size distribution shown in FIG. 10 and Table 4—corresponds to clay particles with diameters less than 1.89 μm (the 0.1 percentile for T1). It should further be noted that the slope of the curve is still after 24 hours of recycling, or "200 m filter length" not zero, indicating that particles are still being captured in the receiving layer.

By comparing the natural clay experiments conducted with T1 on the small and large filter-cells it can be seen that the removal rate in the large filter-cell is greater than what would be expected from a simple extrapolation from the results obtained in the small filter-cell. In the small filter-cell 37% of the clay suspension is removed after passing of 0.8 m filter-length at a specific flow rate of q=2 cm/min. In the large filter-cell the same reduction of 37% is achieved after 8.3 m at a specific flow rate of q=60 cm/min. Thus, when the specific flow rate is increased almost 30 times the necessary increase in filter length to obtain the same degree of purification is only 10 times. This points to the mixing-zone mass flow transfer mechanism being relatively more efficient at higher flow rates than at low in terms of transferring suspended solids into the receiving layer.

Conclusion:
The experiments with suspended solids support the expectance that particles in the clay fraction can be removed with dual porosity filtration. The experiments point to a correlation between particle size and removal rates, in accordance with classical sedimentation theory. However, the experiments also point to a more efficient removal at higher flow rates than what would be expected from results obtained at lower flow rates. This is ascribed to mixing-zone mass flow.

A Dual Porosity Filter Unit for Removal of Nitrate from Groundwater

Nitrate is an example of solute that can render groundwater unsuitable for drinking water purposes.

A filter unit is constructed with one convective layer and one receiving layer (FIG. 14) The fluid in the receiving layer flows adjacent to but in a direction perpendicular to the main direction of flow in the convective layer, and is recycled through an external container, that facilitates the nitrate removal through bacterial reduction of nitrate to gaseous nitrogen. It is to be understood that the convective and receiving layer can be stacked to give a sandwich structure.

Groundwater contaminated with nitrate is applied to an inlet structure (4), to which the one end of the convective layer (1) is connected, to allow the groundwater to enter. The opposite end of the convective layer is connected to an outlet structure (5) that allows for the treated groundwater to leave the filter unit. A pressure head across the filter unit must be established.

The receiving layer (2) is placed below and parallel to the convective layer. The receiving layer has its own inlet structure (6) and outlet structure (7), and between the outlet and the inlet is inserted a container (8) through which the water in the receiving layer passes. The container contains a carbon-source to be used as energy source for nitrate removing bacteria, a process that will take place in the container and in the receiving layer itself. The receiving layer (1), the container (8) and the connecting tubing (10) constitute a closed system with its own pressure head, established by means of the recycling pump (9) (FIG. 14b). The receiving layer (2) may be filled with a filtering material that provides for adherence of bacteria.

Between the convective layer (1) and the receiving layer (2) is inserted a bacteria-proof membrane (3).

When groundwater is applied to the inlet structure (4) it will flow into the convective layer (1). The first water will fill up both the convective layer (1) and the receiving layer (2) including the external container (8). Additional groundwater will flow through the convective layer (1) to the outlet structure (5). When the recycling pump (9) is started, water in the receiving layer (2) will continuously flow to the outlet structure (6), reach and pass the container (8) and return to the inlet structure (7). Nitrate in the convective layer (1) will be transferred to the fluid in the receiving layer (2) by means of mixing-zone mass flow and diffusion. The fluid in the receiving layer (2) will carry the nitrate to the external container (8). The carbon-source in the external container (8) will enrich the fluid with carbon-compounds that can be used as a basis for bacterial removal of nitrate. The reduction of nitrate can take place in the container (8) and elsewhere in the receiving layer system. The receiving layer system must be equipped with a device that allows for emission of gasses The type of carbon-source (e.g. plant debris, compost or sugar) must provide adequate molecules for the bacteria, and it must be avoided that the carbon-source releases components that are unwanted in the treated groundwater, e.g. heavy metals, organic pollutants etc. This also includes excess of carbon-molecules, implying that the release rate of the carbon-molecules in the container must be adjusted to the nitrate concentration in the groundwater and the reduction rate. The bacteria-proof membrane (3) secures that bacteria in the receiving layer (2) do not enter the fluid in the convective layer (1).

The flow rate in the convective layer (1) and the flow rate in the receiving layer (2) should be optimized to provide optimal conditions for transfer and reduction of nitrate.

A Suspended Solids Dual Porosity Filter

Sediment, or suspended solids, is a problem in many types of wastewater. Where drinking water is supplied from surface waters sediment is often a problem, not at least where the surface water is in motion, e.g. floods. At high flow rates, for instance in spring when snow is melting, or in rainy periods, soil erosion causes the water to have a high content of clay and silt. This results in low quality drinking water and makes treatment of the water with e.g. ozone or chlorine more difficult. Much industrial wastewater also contains suspended solids as the main component.

A filter unit is constructed with the purpose of accumulating suspended solids from wastewater or surface water, or any other type of water. It consists of a sandwich of several alternating convective and receiving layers (FIG. 15). No structure is build in for supporting convective flow, simply the receiving layers are held together by e.g. parallel sutures running along the main direction of flow, to allow for incoming water to press the receiving layers apart to a predetermined maximal distance. The receiving layers are formed with ridges and valleys to allow for stagnant water and sediment accumulation in the valleys.

Pressure head, inlet structure and outlet structure have to be designed.

The material used to construct the receiving layer can be any suitable. Filters with a shorter life time can be provided by means of organic materials, for instance coconut fibers woven or pressed into a mat with appropriate valleys and ridges. The mesh-size of the mat must be small enough to hold back the solids in question.

The receiving layer can also be made from inorganic materials, for instance some type of plastic or another polymer. If the receiving layers are given a self-supporting structure they can be tilted (e.g. 45°) in the direction perpendicular to the main direction of flow, thereby allowing for trapped sediment to roll along the bottom of the valleys to be picked up in a furrow or another structure placed along the filter unit. In this way the filter unit can be self-cleaning. See FIG. 16. The furrow must have a several times smaller outlet capacity than the capacity of the main outlet to which the convective layers are connected, in order to prevent fluid in the convective layer from bypassing the filter through the furrow. By maintaining a reduced outlet in the furrow a small flow can be allowed perpendicular to the main direction of flow to help flushing out particles settled on the bottom of the receiving layers.

Such a self-cleaning sediment trap based on the principles of dual porosity filtration can also be a favorable alternative to traditional sand settling in concrete basins.

A further modification of a suspended solid dual porosity may allow trapped organic solids and dissolved nutrients to be metabolized, for instance by diurnal alternating cycles of wastewater saturation and dewatering of the filter, to maintain a high oxygen concentration in the filter.

A Dual Porosity Filter for Road Runoff Treatment

Road runoff is characterized by erratic, but often large and rapid flows. Its pollution load is characterized by comprising particles, colloidal particles and solutes in most variable concentrations. The solutes may comprise both organic contaminants like mineral oil and PAH, and inorganic contaminants like heavy metals, especially zinc, copper and lead, and phosphate. In this example the filter unit is designed to remove particles down to a size of approximately 2 μM and the heavy metals zinc, copper and lead.

The filter unit is build from one convective layer and one receiving layer. The receiving layer is provided by confining a filtering material, in this case lime grains with approximate diameters 1-4 mM, between two membranes. Lime grains are selected based on the experiments described above. The upper membrane is made from polyethylene and has a mesh size of 0.7 mM. The lower membrane is made from polyethylene too, but has a fine mesh size, rendering it almost waterproof. The two membranes are combined by sutures through the lime grains. The thickness of the receiving layer, and thus the approximate thickness of the lime is 1 cM. The sutures are parallel in the direction of the flow, and appear at intervals of 5 m. The convective layer is made from Enkadrain 8004H/5-2s/D110P, which is a velvet nylon net with a thickness of 4 mM. At a 1% hydraulic gradient a convective layer like this has a hydraulic capacity of 0.042 l/s per meter, according to the manufacturer.

The filter unit is made from stacks of sandwiches, each sandwich comprising one receiving layer and one convective layer. The convective layers, but not the receiving layers, is connected to an inlet structure and an outlet structure. FIG. 17.

With a width of the filter unit of 50 m and a height of the filter unit corresponding to 60 sandwiches the filter unit has a hydraulic capacity at the given pressure head of 130 L/s.

Based on the experiments conducted in the laboratory described previously, especially the experiments with simulating longer filter lengths, i.e. experiments no. 2 and 6, the length of the filter unit is suggested to 100 m, in order to obtain a high removal of contaminants.

The invention claimed is:

1. A method for transferring substances between layers of liquid or between layers of gas, said method comprising
   i. providing a device comprising
      a. at least one convective layer for conducting either a liquid or gas of interest, where said liquid or gas comprises at least a first substance to be removed and optionally said liquid or gas is to be enriched by at least a second substance, and wherein said at least one convective layer has a thickness between 1 mm and 5 cm when conducting liquids and within 0.1 and 2 mm when conducting gas, and b. at least one receiving layer for conducting either liquid or gas of similar form as in the convective layer and said liquid or gas fill out empty space of said receiving layer and to which receiving layer or from which receiving layer the substances are transferred, and wherein said at least one receiving layer is designed as a structure having a fluid-proof or nearly fluid-proof frame located to obtain almost stagnant liquid or gas in the receiving layer or to obtain a liquid or gas running in another direction than in the convective layer through an inlet and/or outlet structure, or said at least one receiving layer has a grid-like substructure, or a ridge and valley structure perpendicular to the main direction of flow of the convective layer, or said at least one receiving layer has a filtering material selected from the group of sand, gravel, perlite, vermiculite, anthracite, activated carbon, charcoal, diatomaceous soil, chitin, chitosan, pozzolan, lime, marble, clay, iron-oxide-coated minerals (e.g sand), double metal-hydroxides, LECA, rockwool, glass wool, zeolithes, fly ash, soil, limed soil, iron-enriched soil, bark, humus, lignin, compost, leaves, seaweed, algae, alginate, xanthate, peat moss, bone gelatin beads, moss, wool, cotton, cocos fibres, other plant fibres, and modification hereof, and/or said at least one receiving layer and said at least one convective layer have a length of at least 5 m, and wherein said device is located such that said at least one convective layer and said at least one receiving layer are positioned horizontally or at an angle between horizontal and inclining 45° from horizontal, ii. passing a liquid or gas to be treated through said device, wherein said liquid or gas of interest within said at least one convective layer is running in a direction parallel to said at least one receiving layer, and wherein liquid or gas in said at least one receiving layer is either:

a. stagnant, or b. running in another direction, and/or running with a different speed, when compared to the liquid or gas in said at least one convective layer, iii. allowing substances to be transferred to or from said at least one receiving layer without said receiving layer being percolated by said liquid or gas of interest of the convective layer, such that the first substance is removed from said liquid or gas and said liquid or gas is optionally enriched by the second substance, and iv. obtaining a liquid or gas of interest in said at least one convective layer from which the first substance is removed and said liquid or gas is optionally enriched by the second substance.

2. The method according to claim 1, wherein the receiving layer is positioned below the convective layer.

3. The method according to claim 1, wherein the substances are transferred to the at least one receiving layer due to sedimentation, mixing layer mass flow, and/or diffusion.

4. The method according to claim 3, wherein the substances are retained within the receiving layer by precipitation, sorption or any other retention mechanism.

5. The method according to claim 3, wherein the receiving layer further has an affinity for the substances.

6. The method according to claim 1, where the filter further comprises a second receiving layer adjacent the convective layer and opposite the first receiving layer.

7. The method according to claim 1, where at least one receiving layer comprises material selected from the list consisting of sand, gravel, perlite, vermiculite, anthracite, activated carbon, charcoal, limed soil, iron-enriched soil, diatomaceous soil, chitin, chitosan, pozzolan, lime, marble, clay, iron-oxide-coated minerals, double metal-hydroxides, LECA, rockwool, glasswood, zeolithes, fly ash, soil, humus, bark, lignin, compost, leaves, seaweed, algae, alginate, xanthate, peat moss, bone gelatin beads, moss, wool, cotton, other plant fibres, and combinations thereof.

8. The method according to claim 1, wherein the convective layer is empty space.

9. The method according to claim 1, wherein the at least one convective layer comprises a mass of random filament-type plastic fibers with a density which is sufficient to support the filter unit without significant collapse, but allow water to pass freely therethrough.

10. The method according to claim 1, wherein the hydraulic conductivity of the convective layer is at least 1.1 times the hydraulic conductivity of the receiving layer in the main flow direction.

11. The method according to claim 1, wherein the liquid to be filtered comprises waste water, industrial waste water, urban waste water, highway runoff, stormwater.

12. The method according to claim 1, wherein the liquid to be filtered comprises urban waste water, highway runoff, road runoff and/or stormwater.

13. A device for transferring substances between layers of liquid or between layers of gas, said device comprises at least one unit of a filter, said unit of a filter comprising i. at least one convective layer for conducting either a liquid or gas of interest, where said liquid or gas comprises at least a first substance to be removed and optionally said liquid or gas is to be enriched by at least a second substance, and wherein said at least one convective layer has a thickness between 0.1 mm and 5 cm, ii. at least one receiving layer for conducting either liquid or gas of similar form as in the convective layer and said liquid or gas fill out empty space of said receiving layer and to which receiving layer or from which receiving layer the substances are transferred such that the first substance is removed from said liquid or gas and optionally said liquid or gas is enriched by the second substance, and wherein said at least one receiving layer is designed as a structure having a fluid-proof or nearly fluid-proof frame located to obtain almost stagnant liquid or gas in the receiving layer or to obtain a liquid or gas running in another direction than in the convective layer through an inlet and/or outlet structure, or said at least one receiving layer has a grid-like substructure or has a ridge and valley structure perpendicular to the main direction of flow of the convective layer, or said at least one receiving layer has a filtering material selected from the group of sand, gravel, perlite, vermiculite, anthracite, activated carbon, charcoal, diatomaceous soil, chitin, chitosan, pozzolan, lime, marble, clay, iron-oxide-coated minerals (e.g sand), double metal-hydroxides, LECA, rockwool, glass wool, zeolithes, fly ash, soil, limed soil, iron-enriched soil, bark, humus, lignin, compost, leaves, seaweed, algae, alginate, xanthate, peat moss, bone gelatin beads, moss, wool, cotton, cocos fibres, other plant fibres, and modification hereof, and said at least one receiving layer and said at least one convective layer have a length of at least 5 m, wherein said liquid or gas of interest within said at least one convective layer is running in a direction parallel to said liquid or gas of said at least one receiving layer, and wherein liquid or gas in said at least one receiving layers is either:

a. stagnant, or
b. running in another direction, and/or running with a different speed, when compared to the liquid or gas in the convective layer, and wherein said substances are transferred to or from said at least one receiving layer without said receiving layers being percolated by said liquid or gas of interest of the convective layer, and wherein said unit of a filter is located such that said at least one convective layer and said at least one receiving layer are positioned horizontally or at an angle between horizontal and inclining 45° from horizontal.

14. The device according to claim 13, further comprising a second receiving layer adjacent the convective layer opposite the at least one receiving layer, being a sandwich filter.

15. The device according to claim 14, comprising a stack of sandwich filters, the stack comprising at least 2 sandwich filters.

16. The device according to claim 13, comprising a stack of alternating convective/receiving layers.

17. The device according to claim 13, wherein an impermeable layer surrounds the device to seal it from the surroundings on all surfaces except the inlet and outlet.

18. The device according to claim 13, wherein the receiving layers comprises material selected from the group consisting of sand, gravel, perlite, vermiculite, anthracite, activated carbon, charcoal, soil, limed soil, iron-enriched soil, diatomaceous soil, chitin, chitosan, pozzolan, lime, marble, clay, iron-oxide-coated miners, double metal-hydroxides, LECA, rockwool, zeolithes, fly ash, bark, lignin, compost, seaweed, algae, alginate, xanthate, peat moss, bone gelatin beads, moss, wool, cotton, other plant fibres, combinations thereof, and modifications thereof.

19. The device according to claim 13, wherein the convective layer comprises a mass of random filament-type plastic fibers with a density which is sufficient to support the device without significant collapse, but allow water to pass freely there through.

20. The device according to claim 19, wherein the convective layer comprises a polyethylene or polyester fibrous mesh.

21. The device according to claim 13, wherein the convective layer comprises a mass of open-structured plant fibers with a density which is sufficient to support the device without significant collapse, but allow water to pass freely there through.

22. The device according to claim 13, further comprising a pump for pumping liquid or gas through the filter unit.

23. The device according to claim 13, further comprising a pre-filter adapted to remove particulate material from the liquid or gas prior to passing the liquid or gas into the filter.

24. A method of filtering wastewater comprising directing wastewater into a device according to claim 13.

25. A method of filtering gas comprising directing gas into a device according to claim 13.

* * * * *

UNITED STATES PATENT AND TRADEMARK OFFICE
CERTIFICATE OF CORRECTION

PATENT NO. : 7,588,686 B2 Page 1 of 1
APPLICATION NO. : 10/519025
DATED : September 15, 2009
INVENTOR(S) : Marina B. Jensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,588,686 B2
APPLICATION NO. : 10/519025
DATED : September 15, 2009
INVENTOR(S) : Marina B. Jensen It is certified that error appears in the above-identified patent and that said Letters Patent is hereby corrected as shown below:

Column 3, Line 37, Remove second occurence of "to"

Column 5, Line 28, Replace "hazardeous" with --hazardous--

Column 8, Line 27, Replace "transfered" with --transferred--

Column 10, Line 24, Replace "favours" with --favors--

Column 14, Line 15, Replace "sustances" with --substances--

Column 18, Line 48, Replace "optimised" with --optimized--

Column 26, Line 10, Replace "Runnning" with --Running--

Signed and Sealed this

Ninth Day of November, 2010

David J. Kappos
*Director of the United States Patent and Trademark Office*